United States Patent
Greenberger et al.

(10) Patent No.: US 11,282,133 B2
(45) Date of Patent: Mar. 22, 2022

(54) AUGMENTED REALITY PRODUCT COMPARISON

(71) Applicant: INTERNATIONAL BUSINESS MACHINES CORPORATION, Armonk, NY (US)

(72) Inventors: Jeremy A. Greenberger, San Jose, CA (US); Lisa Seacat DeLuca, Baltimore, MD (US); Kuntal Dey, Vasant Kunj (IN); Seema Nagar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/819,162

(22) Filed: Nov. 21, 2017

(65) Prior Publication Data

US 2019/0156402 A1 May 23, 2019

(51) Int. Cl.
*G06Q 30/06* (2012.01)
*G06K 9/00* (2022.01)
(Continued)

(52) U.S. Cl.
CPC ..... *G06Q 30/0643* (2013.01); *G02B 27/0172* (2013.01); *G06K 9/00671* (2013.01);
(Continued)

(58) Field of Classification Search
CPC ............ G06K 9/00671; G06K 9/6202; G06Q 30/0643; G06Q 30/0623; G06Q 30/0631;
(Continued)

(56) References Cited

U.S. PATENT DOCUMENTS

| 5,040,888 A | 8/1991 | Bonham |
| 5,329,986 A | 7/1994 | Wu |

(Continued)

FOREIGN PATENT DOCUMENTS

| CA | 2498107 | 3/2004 | |
| WO | WO-2013103912 A1 * | 7/2013 | ............. G06Q 30/02 |
| WO | 2014099231 | 6/2014 | |

OTHER PUBLICATIONS

Prasov, Zahar. 2011. Eye gaze for reference resolution in multimodal conversational interfaces. Ph.D. diss., Michigan State University, https://dialog.proquest.com/professional/docview/865809543?accountid=131444 (accessed Sep. 17, 2021). (Year : 2011).*

(Continued)

*Primary Examiner* — Matthew E Zimmerman
*Assistant Examiner* — Latasha D Ramphal
(74) *Attorney, Agent, or Firm* — Schmeiser, Olsen & Watts; Stephanie Carusillo

(57) ABSTRACT

A system, method and computer program products for researching products, reviewing product information, comparing products and making recommendations based on the comparison of similar products using augmented reality. The present disclosure utilizes augmented display systems may take many different forms such a glasses, smart watches or other wearable computer systems or portable computing system such as smart phones, tablet computers, laptops, personal data assistants (PDA's), portable media devices and digital camera systems. The augmented display system view an object digitally captured or recorded, detect the identity of the object using object recognition software and retrieve product information associated therewith. The product information may be overlaid or projected onto a HUD having a graphical user interface that allows the user of the (Continued)

system to view both the retrieved product information and the object (or digital representation thereof) simultaneously.

19 Claims, 17 Drawing Sheets

(51) Int. Cl.
*G02B 27/01* (2006.01)
*G06K 9/62* (2022.01)

(52) U.S. Cl.
CPC ....... *G06K 9/6202* (2013.01); *G06Q 30/0623* (2013.01); *G06Q 30/0631* (2013.01); *G02B 2027/014* (2013.01); *G02B 2027/0138* (2013.01); *G02B 2027/0178* (2013.01)

(58) Field of Classification Search
CPC ........ G02B 27/0172; G02B 2027/0138; G02B 2027/014; G02B 2027/0178
USPC ..................................................... 705/26–27
See application file for complete search history.

(56) References Cited

U.S. PATENT DOCUMENTS

| | | | |
|---|---|---|---|
| 5,528,735 | A | 6/1996 | Strasnick et al. |
| 6,329,986 | B1 | 12/2001 | Cheng |
| 7,109,998 | B2 | 9/2006 | Smith |
| 7,551,750 | B2 | 6/2009 | D'Amato |
| 7,720,932 | B2 | 5/2010 | Wei et al. |
| 8,448,092 | B2 | 5/2013 | Deluca et al. |
| 8,743,145 | B1 | 6/2014 | Price |
| 9,129,430 | B2 | 9/2015 | Salter |
| 9,257,089 | B2 | 2/2016 | Ur |
| 9,298,256 | B1* | 3/2016 | Starner ............... G06T 19/006 |
| 9,563,983 | B2 | 2/2017 | Bean et al. |
| 9,679,417 | B1 | 6/2017 | Ross |
| 9,710,970 | B2 | 7/2017 | Jung et al. |
| 9,922,253 | B2 | 3/2018 | Asbun |
| 10,565,761 | B2 | 2/2020 | Deluca |
| 10,586,360 | B2 | 3/2020 | Deluca |
| 2004/0045204 | A1 | 3/2004 | Miano et al. |
| 2004/0047013 | A1 | 3/2004 | Cai |
| 2006/0232665 | A1 | 10/2006 | Schowengerdt |
| 2012/0206452 | A1 | 8/2012 | Geisner |
| 2013/0050432 | A1 | 2/2013 | Perez |
| 2013/0093787 | A1 | 4/2013 | Fulks |
| 2013/0145304 | A1 | 6/2013 | Deluca et al. |
| 2013/0156318 | A1 | 6/2013 | Beckman |
| 2013/0198030 | A1* | 8/2013 | Linden ............... G06Q 30/0277 705/26.7 |
| 2013/0223673 | A1* | 8/2013 | Davis ...................... G06K 9/18 382/100 |
| 2013/0278631 | A1 | 10/2013 | Border |
| 2013/0293530 | A1* | 11/2013 | Perez ..................... G06F 3/012 345/418 |
| 2014/0168056 | A1 | 6/2014 | Swaminathan |
| 2014/0168262 | A1 | 6/2014 | Forutanpour et al. |
| 2014/0232750 | A1 | 8/2014 | Price |
| 2014/0247281 | A1 | 9/2014 | Ellenby |
| 2014/0282144 | A1 | 9/2014 | Maciocci |
| 2015/0206329 | A1* | 7/2015 | Devries ................. G06F 16/583 345/633 |
| 2015/0220157 | A1 | 8/2015 | Marggraff |
| 2015/0338915 | A1 | 11/2015 | Publicover |
| 2015/0339453 | A1 | 11/2015 | Richards |
| 2016/0025971 | A1 | 1/2016 | Crow |
| 2016/0027221 | A1 | 1/2016 | Blanchflower et al. |
| 2016/0042251 | A1* | 2/2016 | Cordova-Diba ..... G06K 9/4604 382/180 |
| 2016/0042563 | A1 | 2/2016 | Ur |
| 2016/0049013 | A1 | 2/2016 | Tosas Bautista |
| 2016/0085301 | A1 | 3/2016 | Lopez |
| 2016/0155267 | A1 | 6/2016 | Bean |
| 2016/0217623 | A1* | 7/2016 | Singh .................... G09G 3/003 |
| 2016/0259608 | A1 | 9/2016 | Bean |
| 2016/0259977 | A1 | 9/2016 | Asbun |
| 2016/0283793 | A1 | 9/2016 | Leckey |
| 2017/0060230 | A1 | 3/2017 | Faaborg |
| 2017/0102545 | A1 | 4/2017 | Hua |
| 2017/0124769 | A1 | 5/2017 | Saito |
| 2017/0124928 | A1 | 5/2017 | Edwin |
| 2017/0237974 | A1 | 8/2017 | Samec |
| 2017/0277374 | A1 | 9/2017 | Ozcan |
| 2017/0318235 | A1* | 11/2017 | Schneider .......... G06K 9/00664 |
| 2017/0365100 | A1 | 12/2017 | Walton |
| 2018/0054562 | A1 | 2/2018 | Li |
| 2018/0082117 | A1 | 3/2018 | Sharma |
| 2018/0095942 | A1 | 4/2018 | Singh |
| 2018/0330531 | A1 | 11/2018 | Mullins |
| 2019/0156535 | A1 | 5/2019 | Deluca |
| 2019/0180483 | A1 | 6/2019 | Deluca |

OTHER PUBLICATIONS

Prasov, Zahar. 2011. Eye gaze for reference resolution in multimodal conversational interfaces. Ph.D. diss., Michigan State University, https://dialog.proquest.com/professional/docview/865809543?accountid=131444 (Year: 2011).*

Kalkofen D. et al.; Visualization Techniques for Augmented Reality. Chapter 3 in: Furht B. (eds) Handbook of Augmented Reality; Jul. 13, 2011; pp. 65-98.

Neumann, U. et al.; Tracking for Augmented Reality on Wearable Computers; Virtual Reality, vol. 3, Issue 3; Sep. 1998; pp. 167-175.

Anonymously; "Displaying Large Models in Augmented Reality"; http://ip.com/IPCOM/000236647D; May 7, 2014.

Anonymously; "Augmented Reality Overlays Interfering with Physical Objects in the Real World"; http://ip.com/IPCOM/000245242D; Feb. 19, 2016.

Anonymously; "Method for Remote Object Search and Viewing Using Augmented Reality Glasses"; http://ip.com/IPCOM/000240512D; Feb. 4, 2015.

Anonymously; "Situated Augmented Reality"; http://ip.com/IPCOM/000239026D; Oct. 2, 2014.

Bilenko, Mikhail et al.; Adaptive Product Normalization: Using Online Learning for Record Linkage in Comparison Shopping; Proceedings of the 5th International Conference on Data Mining; Nov. 2005; pp. 58-65.

Anonymously; System and method of reorganizing text in image (screen shot or picture) with the image is being resized; IP.com; IPCOM000215227D; Feb. 22, 2012; 13 pages.

Friedman, Jack P.; List of IBM Patents or Patent Applications Treated as Related; Dec. 14, 2017; 1 page.

Jain, Puneet et al.; OverLay: Practical Mobile Augmented Reality; Proceedings of the 13th Annual International Conference on Mobile Systems, Applications, and Services; May 18-22, 2015; 14 pages.

Watfa, Allie et al.; A Method and System for Displaying a Personalized Advertisement Containing User Content; IP.com; IPCOM000237438D; Jun. 18, 2014; 3 pages.

Zhu, Wei et al.; Personalized In-store E-Commerce with the PromoPad: an Augmented Reality Shopping Assistant Electronic Journal for E-Commerce Tools and Applications 1.3; Jan. 2004; pp. 1-19.

Friedman, Mark J.; Updated List of IBM Patents or Patent Applications Treated as Related; Jan. 18, 2018; 1 page.

Borkowski, Stanislaw et al.; Spatial Control of Interactive Surfaces in an Augmented Environment; International Workshop on Design, Specification, and Verification of Interactive Systems; Engineering Human Computer Interaction and Interactive Systems; 2004; pp. 228-244.

Butkiewicz, Michael et al.; Klotski: Reprioritizing Web Content to Improve User Experience on Mobile Devices; 12th USENIX Symposium on Networked Systems Design and Implementation; May 4-6, 2015; pp. 438-453.

AWE 2016; Augmented Reality Glasses with Eye Tracking: Retrieved from the Internet Oct. 24, 2017; URL: http://singlegadget.com/awe-2016-augmented-reality-glasses-eyetracking/; 3 pages.

(56) References Cited

OTHER PUBLICATIONS

IBM Marketplace WATSON; Visual Recognition; URL: https://www.ibm.com/watson/services/visual-recognition/; Sep. 2017; 6 pgs.
Mell, Peter et al.; "The NIST Definition of Cloud Computing;" National Institute of Standards and Technology; Special Publication 800-145; Sep. 2011; 7 pages.

* cited by examiner

AUGMENTED REALITY PRODUCT COMPARISON

TECHNICAL FIELD

The present disclosure relates generally to augmented reality systems, methods and tools.

BACKGROUND

Augmented reality (AR) is a live direct or indirect view of a physical real-world environment whose elements of the physical world are modified with computer generated sound, video or graphics when displayed through a computing system. AR is related to the concept of computer-mediated reality, in which a view of reality is modified by a computer. Augmented reality enhances one's current perception of reality, whereas in contrast, virtual reality replaces the real world with a simulated one. Augmentation techniques are typically performed in real time and in semantic context with environmental elements, such as overlaying supplemental information over a live video feed.

With the help of advanced AR technology (e.g. adding computer vision and object recognition) the information about the surrounding real world of the user becomes interactive and digitally manipulatable. Information about the environment and its objects are overlaid onto views and images of the real world. This information can be virtual or real. For example, seeing other real sensed or measured information such as electromagnetic radio waves overlaid in exact alignment with where they are in space.

SUMMARY

A first embodiment of the present disclosure provides a method for comparing products using augmented reality comprising the steps of: detecting, by a processor, a presence of an object being viewed through a visual recognition system; determining, by the processor, the object being viewed by the visual recognition system; querying, by the processor, a data source for product information describing one or more features of the object being viewed; overlaying, by the processor, the product information onto a heads-up display (HUD) generated by the display device in a vicinity of the object or a digital representation of the object recorded by the visual recognition system in real-time corresponding to the product information; generating, by the processor, a digital overlay comparing and contrasting features of the object currently recorded through the visual recognition system and the previously viewed objects; and displaying, by the processor, the digital overlay comparing and contrasting features of the object currently recorded by the visual recognition system onto the HUD of the display device.

A second embodiment of the present disclosure provides a computer system, comprising a processor; a memory device coupled to the processing unit; and a computer readable storage device coupled to the processor, wherein the storage device contains program code executable by the processing unit via the memory device to implement a method for comparing products using augmented reality comprising the step of: detecting, by the processor, a presence of an object being viewed through the visual recognition system; determining, by the processor, the object being viewed by the visual recognition system; querying, by the processor, a data source for product information describing one or more features of the object being viewed; overlaying, by the processor, the product information onto a heads-up display (HUD) generated by the display device in a vicinity of the object or a digital representation of the object recorded by the visual recognition system in real-time corresponding to the product information; generating, by the processor, a digital overlay comparing and contrasting features of the object currently recorded through the visual recognition system and the previously viewed objects; an displaying, by the processor, the digital overlay comparing and contrasting features of the object currently recorded by the visual recognition system onto the HUD of the display device.

A third embodiment of the present disclosure provides a computer program product comprising: one or more computer readable hardware storage devices having computer readable program code stored therein, said program code containing instructions executable by the one or more central processing units (CPU) to implement a method for comparing products using augmented reality comprising the steps of: detecting, by the CPU, a presence of an object being viewed through a visual recognition system; determining, by the CPU, the object being viewed by the visual recognition system; querying, by the CPU, a data source for product information describing one or more features of the object being viewed; overlaying, by the processor, the product information onto a heads-up display (HUD) generated by the display device in a vicinity of the object or a digital representation of the object recorded by the visual recognition system in real-time corresponding to the product information; generating, by the CPU, a digital overlay comparing and contrasting features of the object currently recorded through the visual recognition system and the previously viewed objects; and displaying, by the CPU, the digital overlay comparing and contrasting features of the object currently recorded by the visual recognition system onto the HUD of the display device.

BRIEF DESCRIPTION OF THE DRAWINGS

FIG. 2b depicts a front view of the embodiment of the augmented display system of FIG. 2a.

FIG. 2c depicts a side view of the embodiment of the augmented display system of FIG. 2a.

FIG. 3b illustrates a rear view of the alternative embodiment of the augmented display system of FIG. 3a.

DETAILED DESCRIPTION

Figure 1:
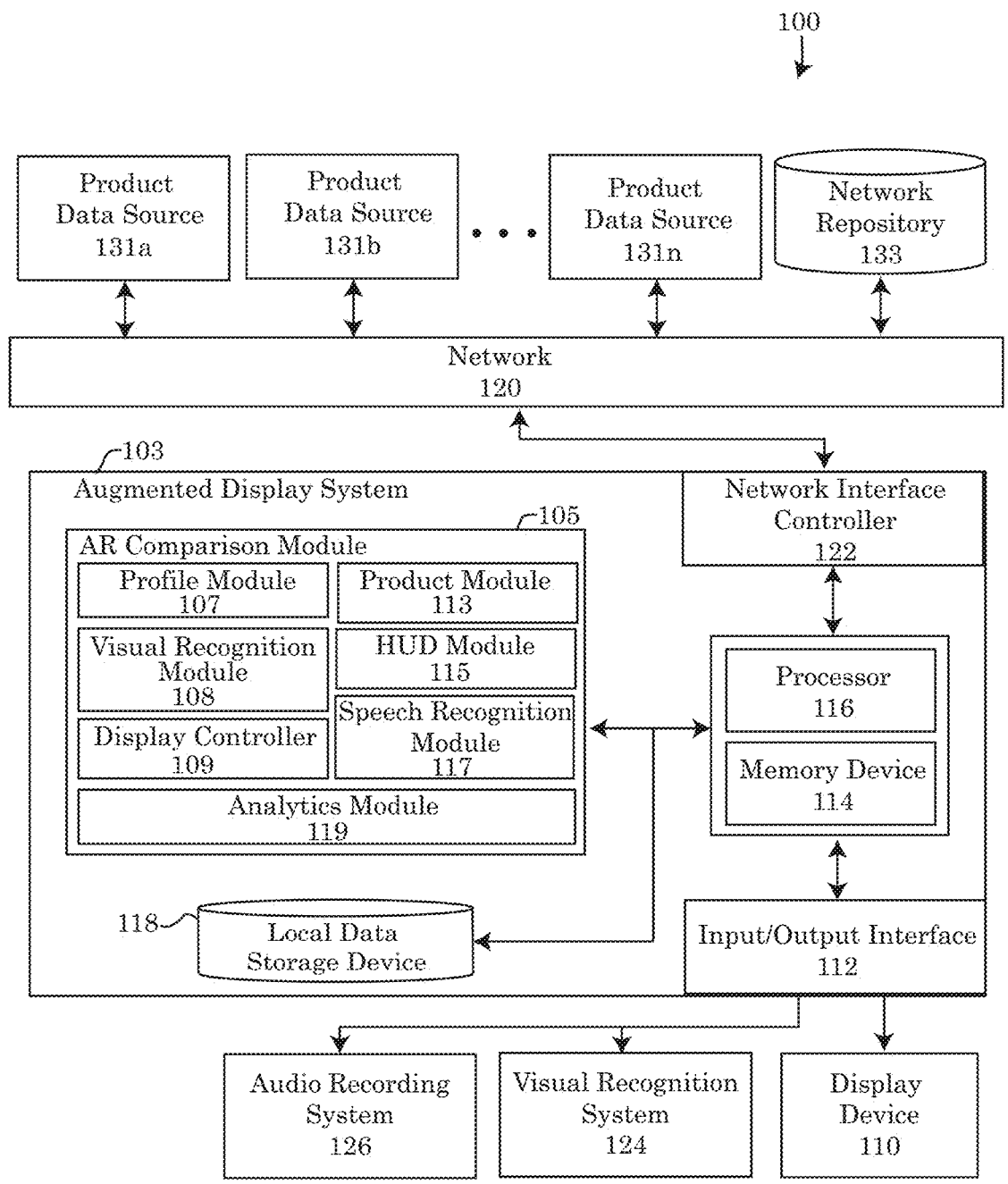
FIG. 1 depicts a block diagram of an embodiment of a system for comparing products using an augmented reality overlay.
Figure 2A:
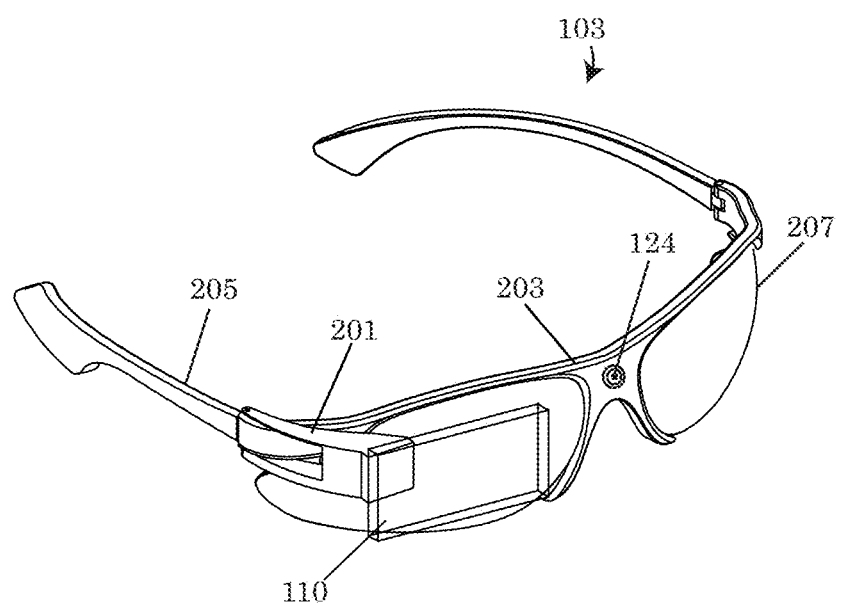
FIG. 2a depicts an isometric view of an embodiment of an augmented display system.
Figure 2B:
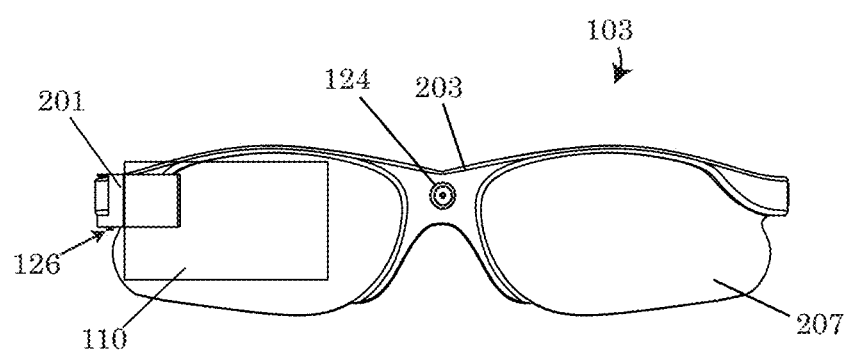
Figure 2C:
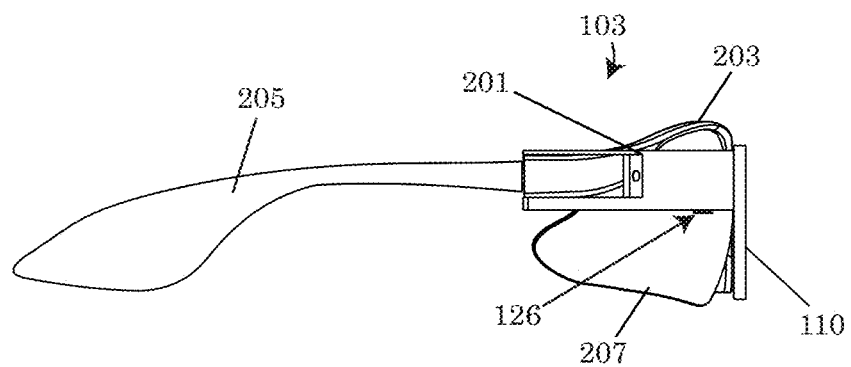
Figure 2D:
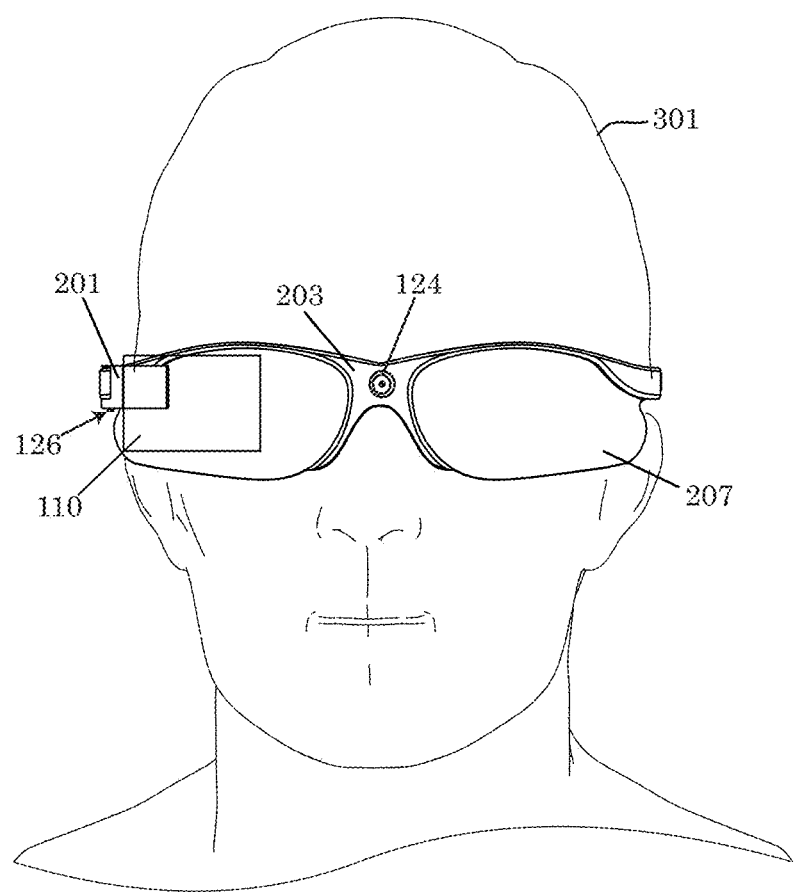
FIG. 2d illustrates an embodiment of an augmented display system equipped by a user.
Figure 3A:
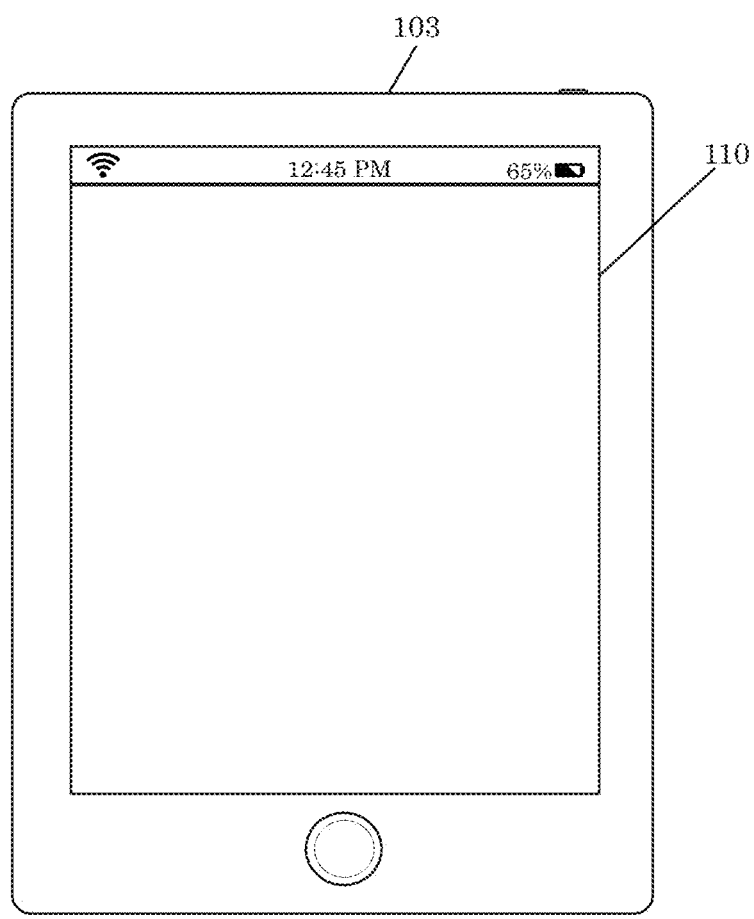
FIG. 3a illustrates a front view of an alternative embodiment of an augmented display system.
Figure 3B:
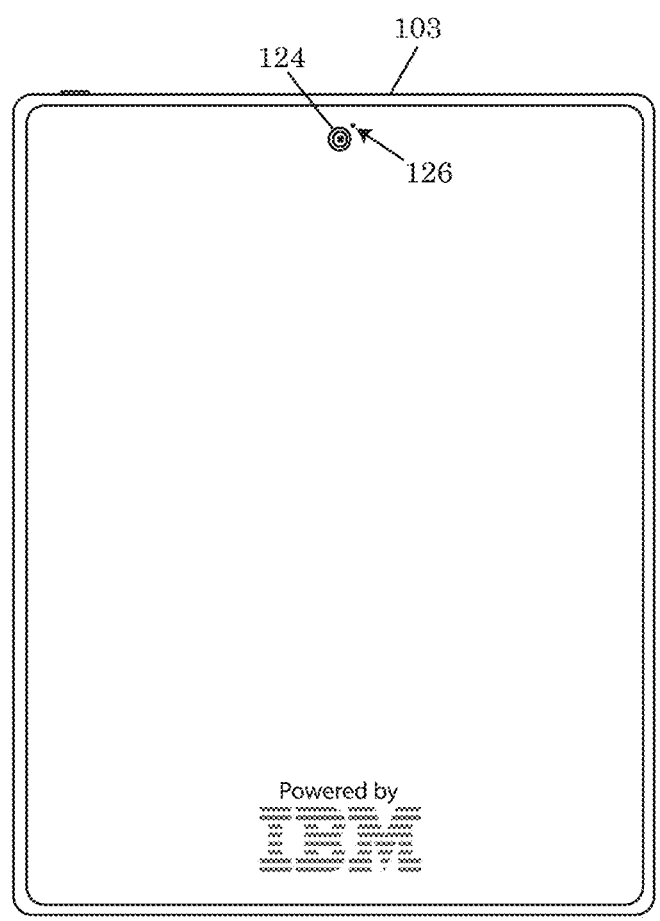

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Traditional methods for comparing products require a user to research the features of similar products and/or visually review product information side-by side across one or more different products. In particular, individuals are reviewing product information in a store; the individual reviewing the product may read information provided by the manufacturer or the store and/or visibly inspect the product to ascertain the presence or absence of one or more of the enabled features. The provided product information does not perform a product comparison of the current product being viewed against a similar product already owned by the individual making the comparison or products previously viewed by the individual in the past. There is thus a need for systems, tools and methods for individuals to actively obtain product information and lists of features for products as well as be able to actively recall product information associated with these previously viewed products for the purpose of making comparisons or obtaining recommendations.

Embodiments of the present disclosure understand the need for a dynamic system that allows researching products, reviewing product information, comparing products and making recommendations based on the comparison of similar products. Embodiments of the present disclosure leverage the use of augmented reality while viewing one or more objects in the real world which may be objects in real space, virtual representations of objects, visual representations of objects (i.e. images in printed media, billboards, artwork, etc.) to identify the objects as one or more product that may be bought or sold. Once identified, the system may retrieve product information about the products being viewed, identifying one or more product features, overlay descriptions of one or more product features or facets onto a dynamic heads up display (HUD) that can be viewed by a user of the augmented reality enabled device (referred to as an augmented display system), store and/or catalog records of the objects being viewed, and recall a history of previously viewed objects or products that may be similar to the currently viewed object for the purpose of making a comparison between the features of each. The HUD may display each of the features of the identified objects in some embodiments, while in other embodiments, the user may selectively view individual features one or more at a time, wherein the augmented display highlights and describes each individual features within in the augmented display. In some embodiments, the user may choose for the HUD to identify new features or facets of the identified objects or associated products based on the different facets of the object currently being view. For example, if a user is viewing only the front side of the object, the HUD may display only the features within the viewing range of user (i.e. each feature on the front side of the object). As the user turns manipulates the position of the device or changes viewing angle, new features may dynamically appear alongside one or more descriptive overlays identifying the new features of the object as the features enter the view of the HUD.

Embodiments of the present disclosure utilizing augmented display systems may take many different forms. For example, the systems incorporating augmented reality capabilities may be wearable systems such a glasses, smart watches or other wearable computer systems. Alternatively, one or more systems integrated with augmented reality capabilities may also include portable computing system such as smart phones, tablet computers, laptops, personal data assistants (PDA's), portable media devices, digital camera systems and the like. Users of the augmented display systems may view objects through a display device equipped on or integrated into the augmented display system such as view finder, lens, screen or monitor. As the augmented display system views an object digitally captured or recorded by the augmented display system, the augmented display system may detect the identity of the object using object recognition software, database records of products or other mechanisms and retrieve product information associated therewith. The product information may be overlaid or projected onto a HUD having a graphical user interface that allows the user of the system to view both the retrieved product information and the object (or digital representation thereof) simultaneously. In some embodiments, the user may toggle through different features of the object currently being viewed, as well as product reviews, social media discussions, comparative products (based on what the current user or other users have viewed) and recommendations.

As the user view toggles through the product information via computer input devices, peripherals, voice commands or hand gestures, the HUD may highlight and feature information directed toward the specific features selected by the user, in some embodiments. In other embodiments, one or more features may automatically display on the HUD as the user views the object or digital representation of the object via the augmented display device. When one or more particular features enter the field of view within a viewing region displayed by the HUD, the product information and details describing a particular feature may be overlaid dynamically onto the object or digital representation of the object in real time when viewed through the display device comprising the HUD.

System for Comparing Products Using Augmented Reality

Referring to the drawings, FIG. 1 illustrates a diagram of an embodiment of a system 100 for comparing products using augmented reality, consistent with the disclosures of this application. Embodiments of system 100 may comprise specialized computer systems referred to as augmented display systems 103, which may each have a specialized configuration of hardware, software or a combination thereof as depicted in FIGS. 1-7 and as described throughout the present disclosure. Embodiments of the augmented display systems 103 may each comprise one or more elements of a generic computer system 900 of FIG. 9 (described in detail below). One or more of the elements of the generic computer system 900 may be integrated into each of the augmented display systems 103 described herein or other computer systems of system 100, for example the product data sources 131a, 131b, 131c . . . 131n and the network repository 133.

Embodiments of the augmented display systems 103 may be a specialized computer system which may include one or more processors 116, specialized hardware or circuitry and/ or software loaded in the memory device 114 of the computer system. The embodiments of the augmented display system 103 may perform functions, tasks and routines relating to the detection and viewing of objects 401, querying product data sources 131a, 131b . . . 131n (generally referred to as "product data source 131") for product information 405a, 405b, 405c (referred to generally as "product information 405") relating to the objects 401 being viewed, retrieving said product information, categorizing and storing records of viewing the object 401, overlaying product information 405 onto the object 401 or digital representations 501 of the object 401 being viewed, presenting a comparison 405c between the currently viewed object 401 and previously viewed objects as well as generating recommendations to a user 301 as a function of the comparison 405c.

Embodiments of the augmented display systems 103 may be connected and placed in communication with one or more additional computer systems or hardware, over a computer network 120. Embodiments of the network 120 may be constructed using wired or wireless connections between each hardware component connected to the network 120. As shown in the exemplary embodiment of FIG. 1, each of the augmented display systems 103 may connect to the network 120 and communicate over the network 120 with additional computer systems such as one or more product data sources 131 and network repositories 133 using a network interface controller (NIC) 122 or other network communication device. Embodiments of the NIC 122 may implement specialized electronic circuitry allowing for communication using a specific physical layer and a data link layer standard, such as Ethernet, Fiber channel, Wi-Fi or Token Ring. The NIC 122 may further allow for a full network protocol stack, enabling communication over network 120 to the augmented display systems 103, product data sources 131 (such as servers hosting product information), network repositories 133 or other computing hardware devices linked together through communication channels. The network 120 may facilitate communication and resource sharing among the augmented display system 103, product data sources 131 and additional hardware devices connected to the network 120, for example a network repository 133 or other network accessible storage devices connected to the network 120. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments, the network 120 may be a cloud computing environment 50. Cloud computing is a model of service delivery enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics of the cloud computing model may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms.

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models under a cloud computing environment 50 may be described as follows:

Software as a Service (SaaS): the capability provided to the consumer is to use the provider's applications running on a cloud infrastructure. The applications are accessible from various augmented display devices 103a, 103b, 103c . . . 103n through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 6:
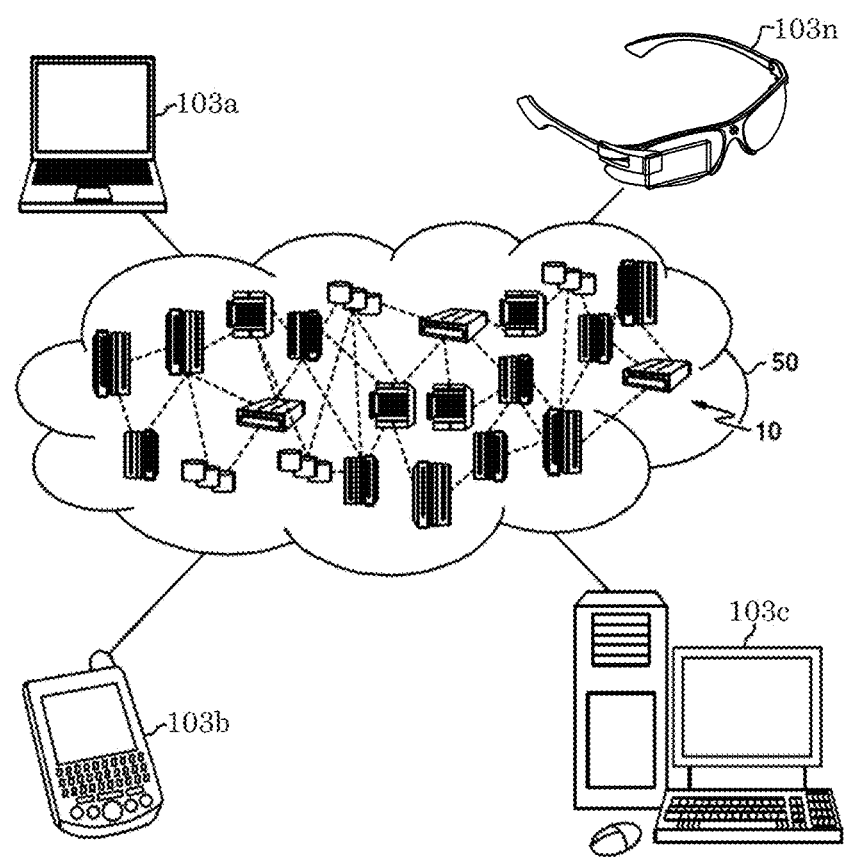
FIG. 6 illustrates a schematic view of an embodiment of a system for comparing products using augmented reality operating in a cloud computing environment.

A cloud computing environment 50 may be service oriented with a focus on statelessness, low coupling, modularity, and semantic interoperability. At the heart of cloud computing is an infrastructure that includes a network of interconnected nodes 10. Referring to the drawings, FIG. 6 is illustrative of a network 120 operating as a cloud computing environment 50. As shown, the cloud computing environment 50 may include one or more cloud computing nodes 10 with which client computing devices, such as one or more augmented display systems 103a, 103b, 103c . . . 103n (referred to collectively as "augmented display systems 103") used by cloud consumers, such as, for example, desktop computers 103c, laptop computers 103a, and mobile communication devices 103b, tablet computers or computer systems integrated into devices as exemplified by the smart glasses 103n shown in FIG. 6.

Computer system nodes 10 of the cloud computing environment 50 may communicate with one another and may be grouped physically or virtually (not shown), in one or more networks, such as Private, Community, Public, or Hybrid clouds as described hereinabove, or a combination thereof, allowing for the cloud computing environment 50 to offer infrastructure, platforms and/or software as services for which a cloud consumer does not need to maintain resources on an augmented display device 103. It is understood that the types of augmented display devices 103 as shown in FIGS. 1-5 are intended to be illustrative only and that nodes 10 of a cloud computing environment 50 can communicate with any type of augmented display devices 103 over any type of network 120 and/or network addressable connection (e.g., using a web browser).

Figure 7:
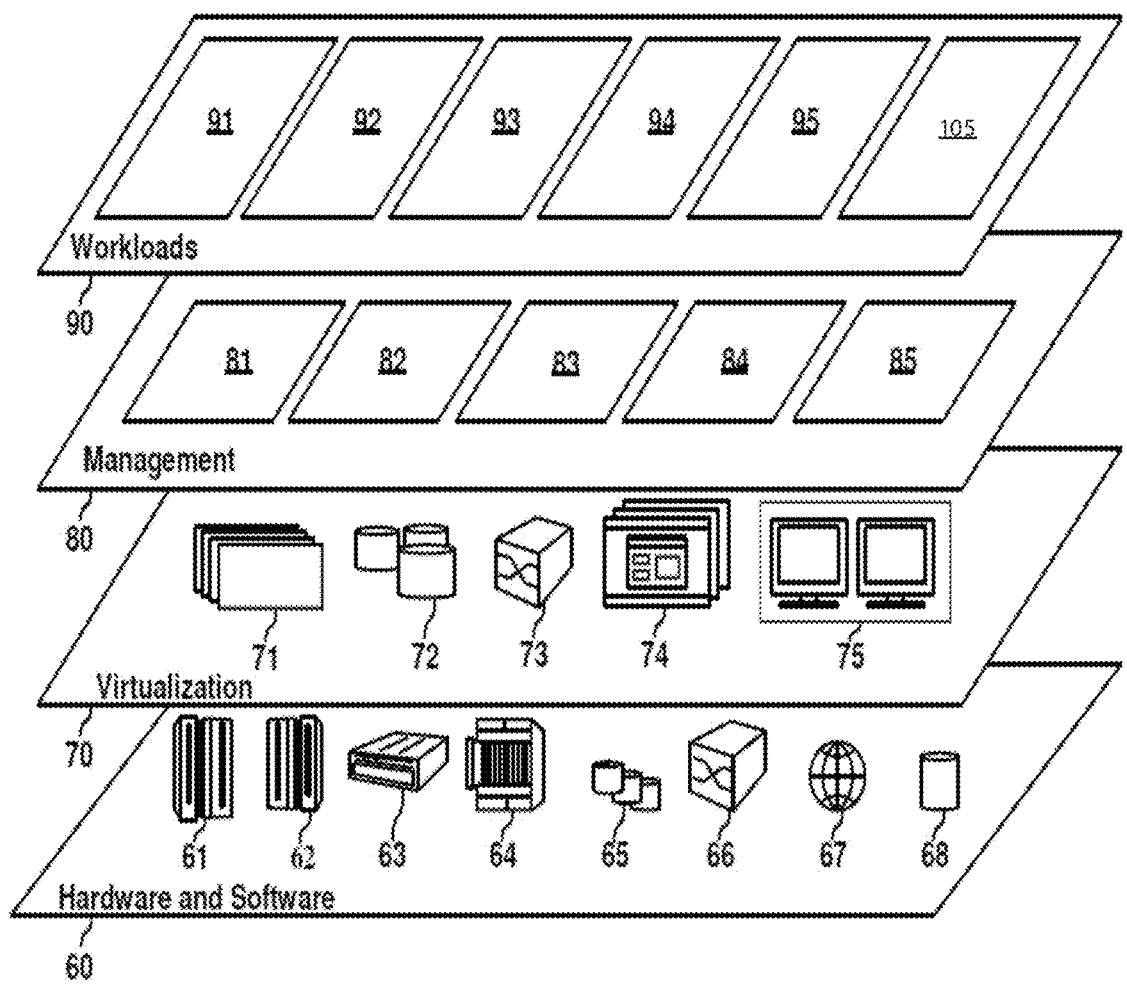
FIG. 7 illustrates a schematic view of an embodiment of the abstraction layers of a cloud computing environment.

Referring now to FIG. 7, a set of functional abstraction layers provided by a cloud computing environment 50 of the network 120 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Embodiments of the management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment of the network 120 for consumers (i.e. geofence creators and users 301) and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: records management 91; web page management 92; searching and results management 93; data analytics processing 94; profile management 95; and AR comparison module 105.

Embodiments of the system 100, and augmented reality functions performed for comparing different products viewed using system 100, may be managed and controlled by an augmented display system 103. The augmented display system 103 may be responsible for detecting the presence of an object 401 being viewed, identifying the object 401 as a product that may be available for sale, retrieving product information associated with the object 104, overlaying the product information onto a HUD depicting the product information and features of the currently viewed product while simultaneously viewing the object 401 in real life, logging the viewing of the product for subsequent reference at a later date to other similarly viewed products, querying previously viewed objects 401, comparing and contrasting the currently product features of a viewed object 401 with product features of other similar object 401 that may have been previously viewed, displaying the compared and contrasted features onto the HUD of the augmented display system 103 and providing recommendations to the user 301 of the augmented display system 103.

Embodiments of the augmented display system 103 may include specialized hardware and/or software integrated into the augmented display system 103 performing each of the functions of the augmented display system 103 mentioned above and throughout this application. The specialized components of the augmented display system 103, implementing each function or task may be part of an AR comparison module 105. The hardware and/or software components of the AR comparison module 105 may include one or more sub modules in some embodiments. These sub modules may include a profile module 107, visual recognition module 108, display controller 109, product module 113, HUD module 115, speech recognition module 117 and analytics module 119. As used herein, the term "module" may refer to a hardware module, software-based module or a module may be a combination of hardware and software resources of a computer system and/or resources remotely accessible to the augmented display system 103 via the computer network 120.

Embodiments of the modules or sub modules described in this application, whether comprising hardware, software or a combination of resources thereof, may be designed to implement or execute one or more particular functions, tasks or routines of the augmented display system 103 described herein. Embodiments of hardware-based modules may include self-contained components such as chipsets, specialized circuitry and one or more memory devices comprising a memory storage medium (described below). A software-based module may be part of a program code or linked to program code or computer code 997, 998 containing specific programmed instructions loaded into a memory device 114 of the augmented display system 103, and/or a remotely accessible memory device 114 of another network accessible computer system accessed remotely by the augmented display system 103 over the network 120. For example, in some embodiments the network accessible computer system connected to the augmented display system 103 may be a web server, application server, remote client device or other network accessible hardware.

Embodiments of the augmented display system 103 may include an AR comparison module 105 which may be responsible for recognizing objects 401 as products, retrieving product information, displaying the product information within a HUD overlaying the product being viewed in real time, comparing the product to similar products previously viewed and making recommendations to a user 301 of the augmented display device 103 based on the comparison between the current product and previously viewed products.

Embodiments of the AR comparison module 105 of the augmented display system 103 may include a profile module 107. The profile module 107 may be responsible for performing the tasks and functions of managing each individual user profile corresponding to the current user 301 operating the augmented display device 103. A user 301 of the augmented display system may identify a particular user profile corresponding the user 301's viewing habits, searches, purchase history and history of viewed products. The profile module 107 may load the user profile corresponding to the current user 301 of the augmented display device 103 into the memory device 114 of the augmented display system 103. Upon loading the appropriate user profile, custom configurations, settings and product search histories may be accessible, allowing for multiple users 301 of a single augmented display system 105 to separately store and recall their own distinct user information and product viewing histories.

In some embodiments, the profile module 107 may retrieve user profiles stored remotely on the network 120, for example in a network repository 133. By storing user profiles remotely, a user 301 may not be tied to a specific augmented display system 103. Rather, even if a user 301 changes the augmented display device the user 301 is using, the profile module 107 may retrieve and update the same user profile across all augmented display systems 103 used by the user. Thus, allowing for a user 301 to load customized settings and build a continuous and seamless viewing history even when periodically using different augmented display systems 103.

Embodiments of the AR comparison module 105 may comprise a visual recognition module 108. The visual recognition module 108 may be responsible for controlling the visual recognition system 124 and detecting objects 401 viewed using the visual recognition system 124. The visual recognition system 124 may include camera systems, video processing hardware/software and video recording hardware/software. Embodiments of the visual recognition system 124 may record or stream visual images and video data from an input device of the visual recognition system 124 (such as a camera) to the visual recognition module 108. The visual recognition module 108 may process the recorded or streamed visual images and/or video data to identify one or more objects 401 that may be the focus of the user 301 physically controlling the positioning of the visual recognition system's input.

Embodiments of the visual recognition module 108 may identify the object 401 being focused on by the user 301 of the augmented display system 103 using one or more techniques for detecting the focus of a user 301. For example, the visual recognition module 108 may calculate the positioning of the user 301's eye gaze, use image recognition to identify the closest object 401 to the user 301, location based solutions which may identify the product of interest based on the known location of the user 301 or by allowing the user 301 of the augmented display system 103 to manually select an option which indicates a user 301's interest in a specific object 401 being viewed by the camera of the visual recognition system 124.

In some embodiments, the visual recognition module 108 may include object recognition software that may implement algorithms and mechanisms that allow for the augmented display system 103 to identify the objects 401 being viewed by the visual recognition system 124. The object recognition element of the visual recognition module 108 may utilize matching, learning, or pattern recognition algorithms using appearance-based or feature-based techniques. Common techniques include deep learning based approaches such as convolutional neural networks (CNN), and feature-based approaches using edges, gradients, histogram of oriented gradients (HOG), Haar wavelets, and linear binary patterns. Some object recognition techniques may implement a variety of learning models including feature extraction, machine learning models, deep learning models, Bag-of-words models such as SURF and MSER, derivative based matching approaches, the Viola-Jones algorithm, template matching, image segmentation and/or blob analysis.

Embodiments of the visual recognition module 108 may draw conclusions directed toward which objects 401 are the focus of the user 301 of the augmented display system 103 as well as the identification of the objects. The visual recognition module 108, may also, based on the identification of the objects 401, categorize or tag the identified objects 401 with keywords, meta tags or identifying indicators which may be used later on in order to compare the products associated with the objects 401 and other similar products associated with the same or related key works, tags or indicators. Based on the identification of the objects 401, the visual recognition module 108 may call the product module 115 (discussed below) to retrieve further information about the identified objects for display to the user 301 of the augmented display system 103.

In some embodiments of the augmented display system 103, the AR comparison module 105 may comprise a display controller 109. A display controller 109 may be an electrical circuit that may perform the task or function of actuating the display device 110 and deliver the stream of images or video data recorded by the visual recognition system 124 to the display device 110. Upon initiating the visual recognition system 124, the image and video data may be transmitted from the visual recognition system's camera(s) to the visual recognition module 108 and/or the display controller 109. The display controller 109 may deliver the frames content of the images and video being recorded by the visual recognition system 124 to the display device 110, allowing for the user 301 of the augmented display system 103 to view the images and/or video data as the data is being inputted into the camera system of the visual recognition system 124. Thus, allowing for a real-time viewing of the image and video data of objects 401 being viewed in real life or as visual representations 501 on the display device 110 of the augmented display system 103.

Embodiments of the AR comparison module 105 may, in some embodiments comprise a product module 113. The product module 113 may perform the task or function of retrieving product information 405 of each object 401 identified by the visual recognition module 108 from one or more product data sources 131, a local data storage devices 118 and/or network repositories 133. Examples of product data sources 131 that may be queried by the product module 113 in order to retrieve product information 405 may include, but are not limited to searching the manufacturers website, accessible product servers, online retail stores, local and network accessible database records, internet forums, and social media. Upon a successful query, the product module 113 may download the product information 405 to the augmented display system 103 or network accessible storage device such as network repository 133. The product information 405 may be transmitted to the HUD module 115 (described below) for augmented display onto the display device 110 overlaying the current set of images and video data being displayed by the display device 110.

The product information 405 retrieved by the product module 113 may also be cataloged and registered in a product database or other data structure for quick retrieval of the product information 405 at a later point in time if needed. The entry of the product information 405 may be tagged with keywords, Meta tags, identifiers and a retrieval date which may allow for quick searches and retrievals of desired product information 405. The product module 113 may in some instances receive a system call from the visual recognition module 108 requesting the product module 113 to search the database of product information 405 for product information pertaining to similar products to the objects 401 currently being viewed by the user 301 of the augmented display system 103. The product module 113 may query the database of stored product information 405 for similar keywords, categories and meta tags, identify similar products (which may be sorted by retrieval date, i.e. the date the original object 401 associated with the product information 405 was viewed) and return the product information 405 to the HUD module 115 for augmented display on the display device 110 over the images and/or video data provided to the display device 110 by the visual recognition system 124.

Embodiments of the augmented display system may further comprise a heads-up display module 115 (abbreviated as "HUD Module 115"). The HUD module 115 may perform the task or function of overlaying a graphical interface (GUI), product information 405, visual and descriptive content and comparison data onto the display device 110 over the images and video data provided by the visual recognition system 124. An example of the HUD module 115 overlaying a graphical interface 410 over the image and video data of real world objects or digital representations 501 thereof can be seen in FIGS. 4a to 5 which highlights one or more features of the HUD displayed by the display device 110.

Figure 4A:
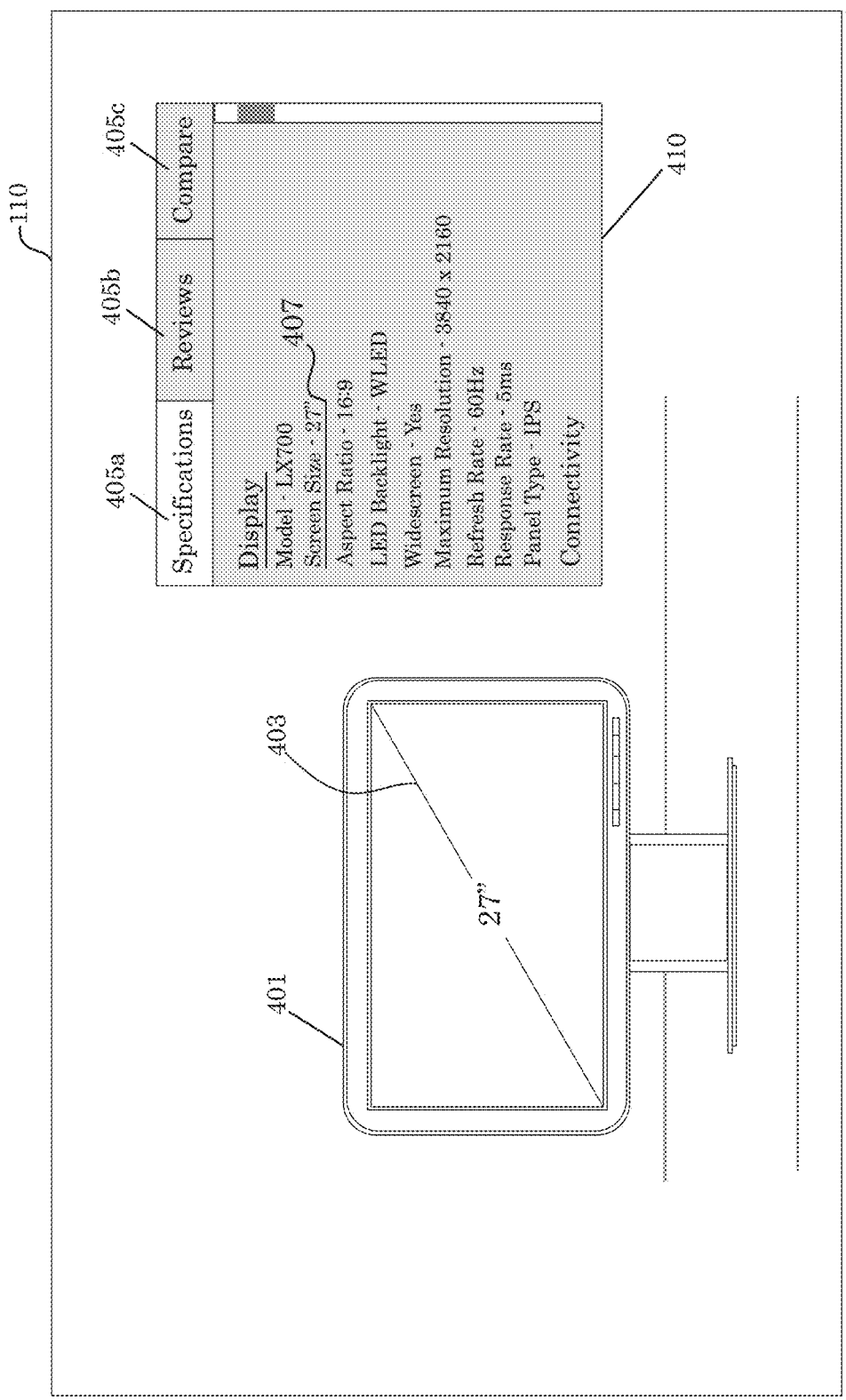
FIG. 4a depicts a first person view of a user viewing an embodiment of a HUD of an augmented display system overlaying product information during the viewing of the object.
Figure 4B:
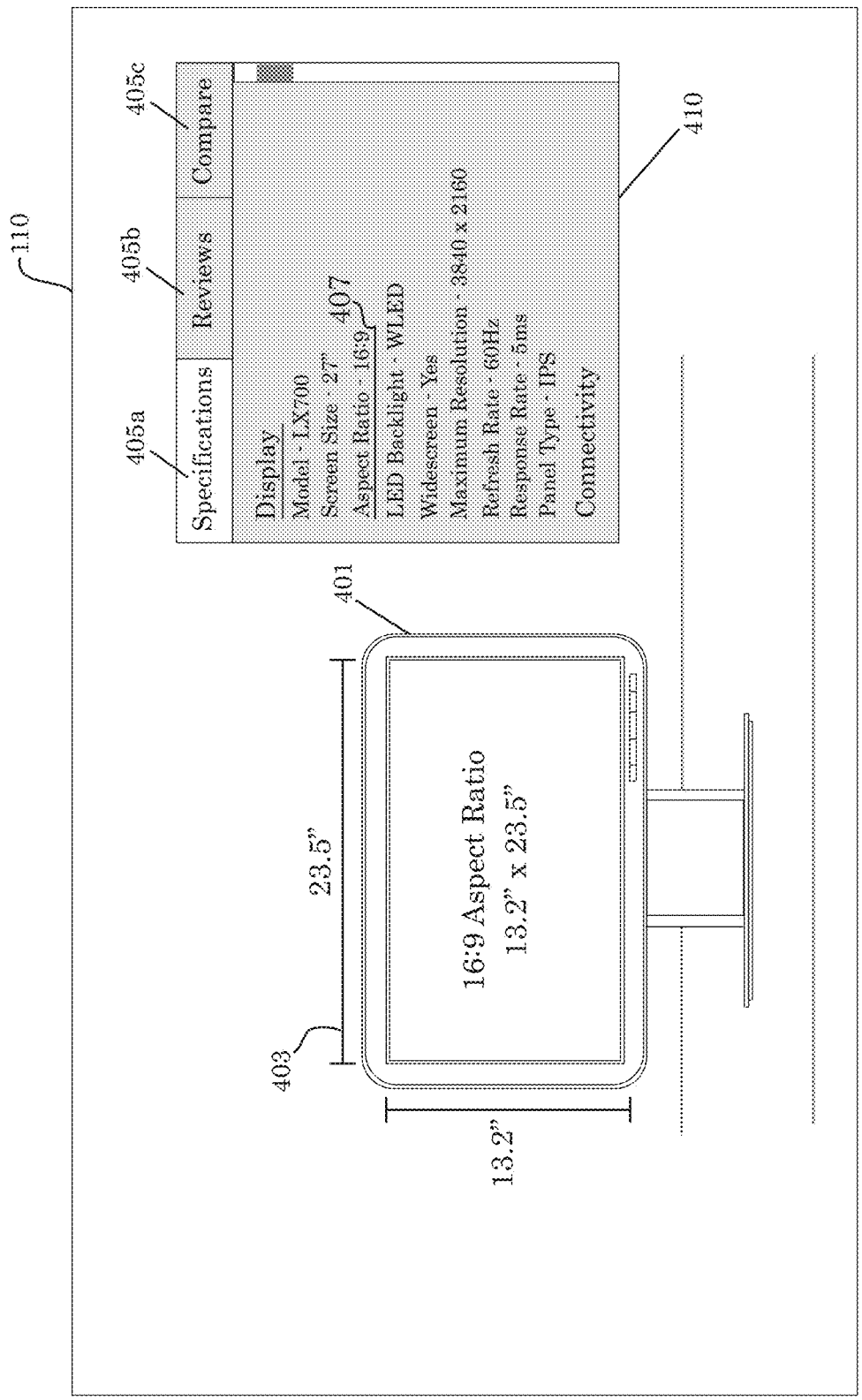
FIG. 4b depicts a first person view of a user viewing an embodiment of a HUD of an augmented display system switching the type of product information displayed while viewing an object.

Referring to the drawings, FIG. 4a depicts an embodiment of a HUD being overlaid onto a display device 110 by providing a GUI capable or presenting product information 405 dynamically to the user or in a manner controlled by the user 301. As shown in FIG. 4a, a user 301 may be currently viewing an object 401, in this example, a computer monitor or television monitor. In some embodiments the display device 110 may be a clear lens which may be made of plastic or glass which allow for the user 301 to see through and view the object 401 through the lens, while the lens of the display device may also act as a screen capable of being projected onto, allowing for both simultaneous display of the GUI 410 of the HUD and looking through the lens or viewfinder to see the object 401 in the real world. In alternative embodiments, the display device may be a monitor or screen displaying a digital representation 501 of the object 401 being recorded by the visual recognition system 124 while simultaneously displaying the GUI of the HUD.

The HUD module 115 may render the product information 405 displayed in the GUI and dynamically change the product information 405 as the selected product feature 407 is toggled through by the user 301. As the user 301 selects a particular feature in the GUI described by the product information 405, the HUD module 115 may graphically describe the feature in greater detail and/or overlay the specific portion of product information virtually onto the object 401 or digital representation 501 thereof using a virtual indicator 403. As shown in the example of FIG. 4a, a HUD displaying a GUI 410 is describing the product specifications 405a of the object 401 being viewed (in this case a computer monitor). As it can be seen in the drawing, the specifications 405a are selected and specifically the selected product feature 407 is the screen size. Based on the selected product feature 407, the GUI 410 of the display device 110 may overlay additional product information 405 describing in greater detail the selected product feature in some embodiments.

In other embodiments, the HUD may dynamically change in response to the selected product feature 403. For instance, as shown in the example of FIG. 4a, the selected product feature 407 may be virtually identified on the object 401 or visual representation 501 thereof in real time. In the example of FIG. 4a, a screen size is the selected product feature 407 and corresponding to the selected product feature, a virtual indicator 403 has identified the screen of the monitor on the object 401 or representation 501 thereof for the user to see via the HUD. Moreover, as the user 301 toggles through the product information 405, the virtual indicators 403 may also change accordingly. As shown by the example in FIG. 4b, as the user 301 changes the selected product feature 407 from the screen size to the aspect ratio information, the virtual indicator 403 on the HUD changes from showing the diameter measurements of the monitor to the height and width of the monitor and virtually overlay virtual indicators 403 demonstrating aspect ratio and measurements in more detail for the user 301 to see via the HUD.

Figure 4C:
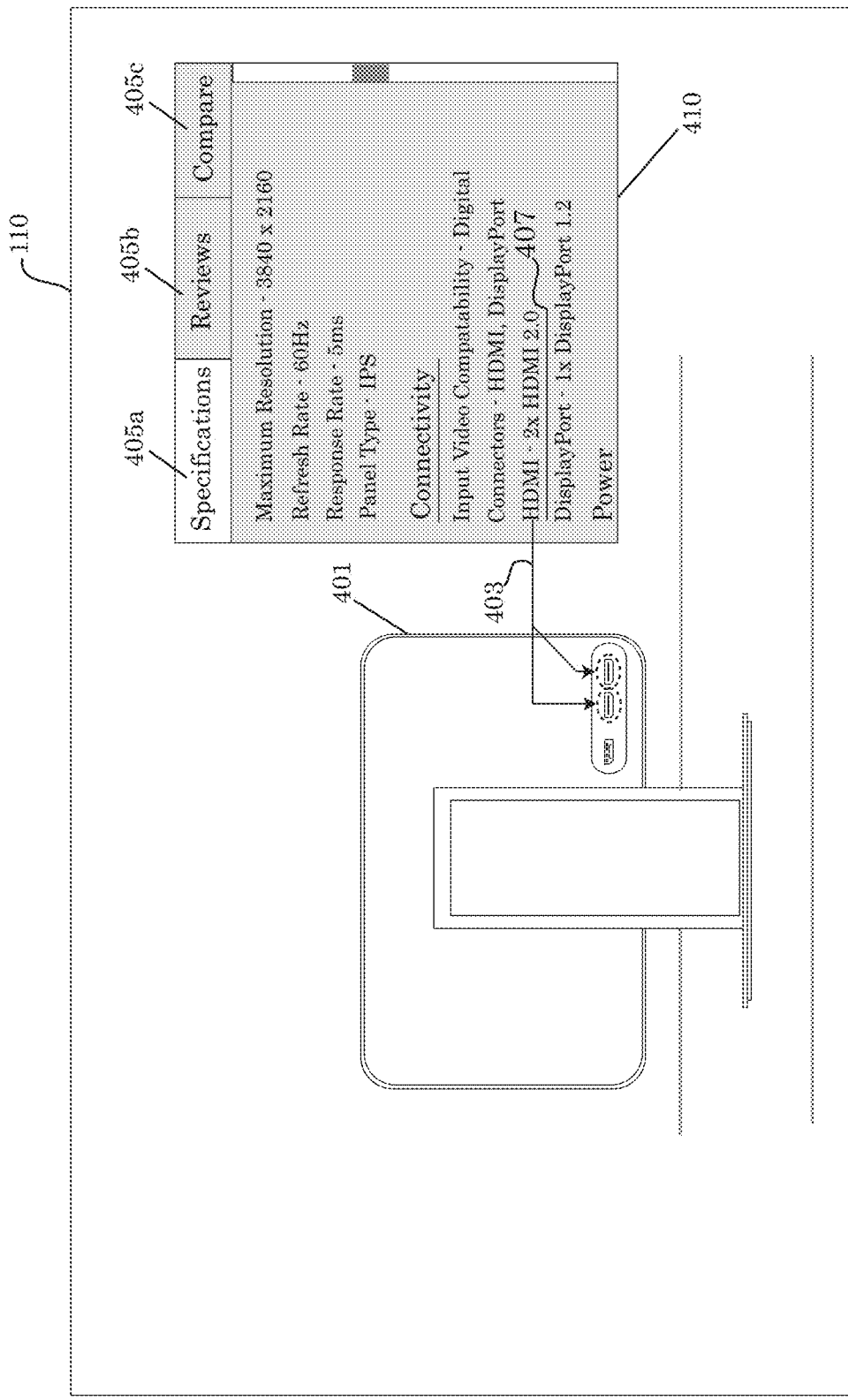
FIG. 4c depicts a first person view of a user viewing an embodiment of a HUD of an augmented display system switching the type of product information presented while viewing an object and overlaying one or more features of the object as the features enter the view of the HUD.

The HUD module 115 may also describe and demonstrate different selected product features within the HUD based on the line of sight or visibility of the features in three-dimensional space. For example, in FIG. 4c, the selected product feature 407 describing one or more of the input ports on the monitor is positioned on the backside of the monitor relative to the position of the screen of the monitor shown in FIGS. 4a-4b. As the user 301 toggles the selected product feature 407 to the HDMI connectors in the specification section 405a of the product information, the virtual indicator 403 may create a pointer or guide line indicating to the user the position of the selected product feature 407. Thus if the user is viewing the object 401 from the front, and the selected product feature 407 in on the rear side, the virtual indicator 403 may direct the user to the proper location. As the selected product feature enters the view of the user 301, the HUD module 115 may dynamically adjust the virtual indicator 403 and graphics of the HUD to point out the selected product features 403 within the viewing distance of the user as shown in FIG. 4c (highlighting the HDMI ports which were not previously viewable until the camera of visual recognition system 124 was able to place the HDMI ports into the frame of the image or visual data.

Figure 4D:
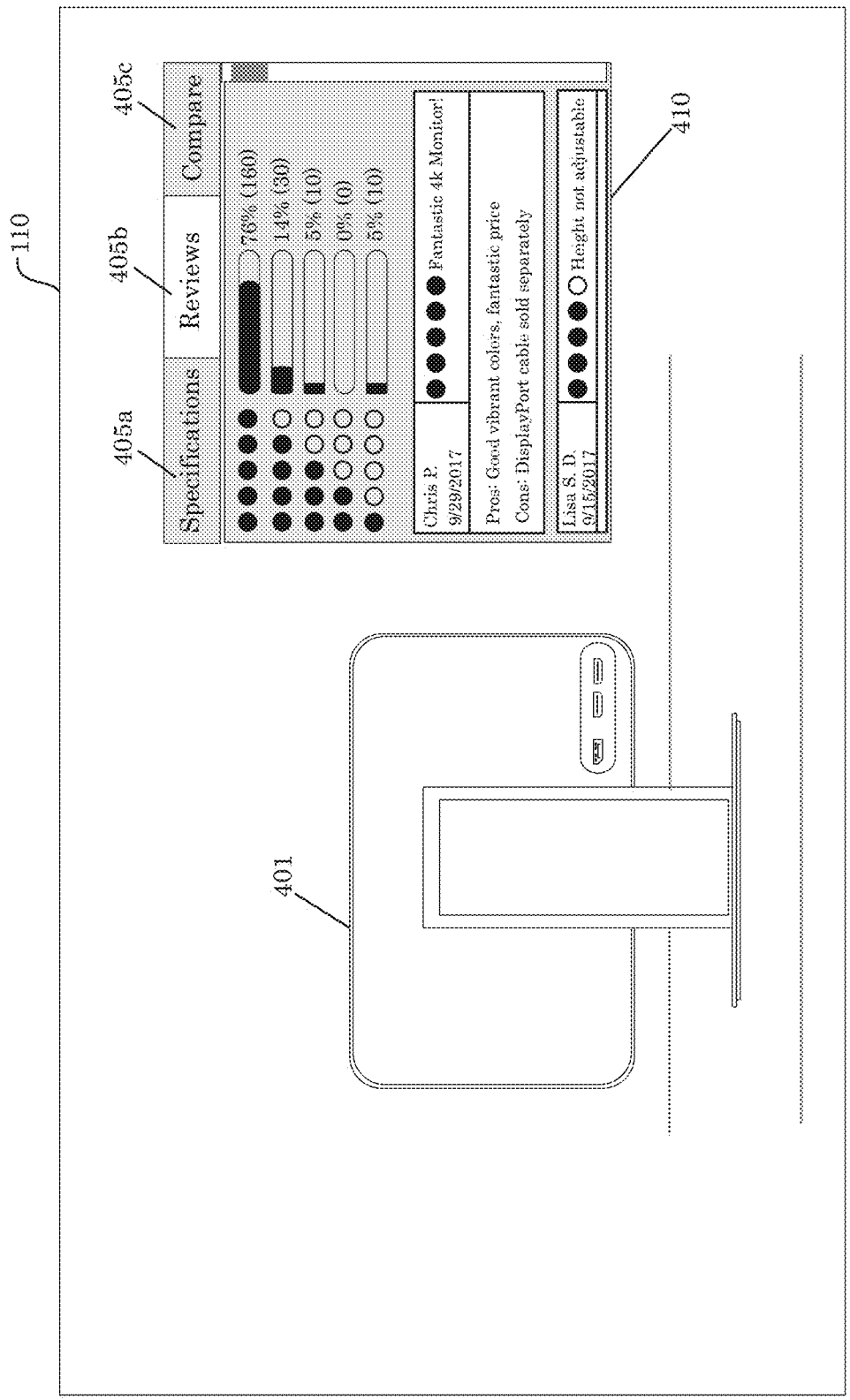
FIG. 4d depicts a first person view of a user viewing an embodiment of a HUD of an augmented display system retrieving and displaying additional product information of a viewed object.
Figure 4E:
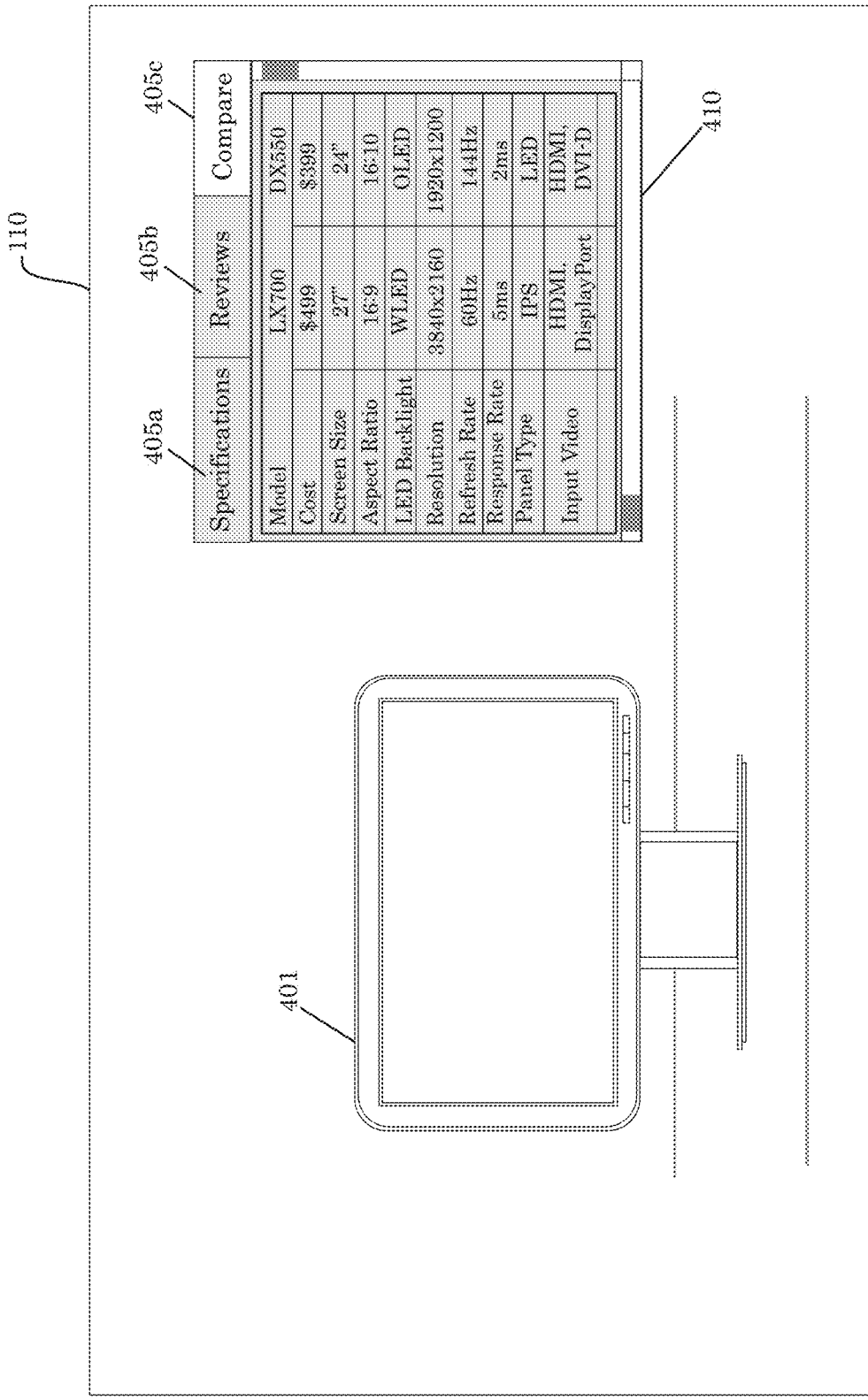
FIG. 4e depicts a first person view of a user viewing an embodiment of a HUD of an augmented display system comparing features of a presently viewed object with features of similar previously viewed objects.
Figure 5:
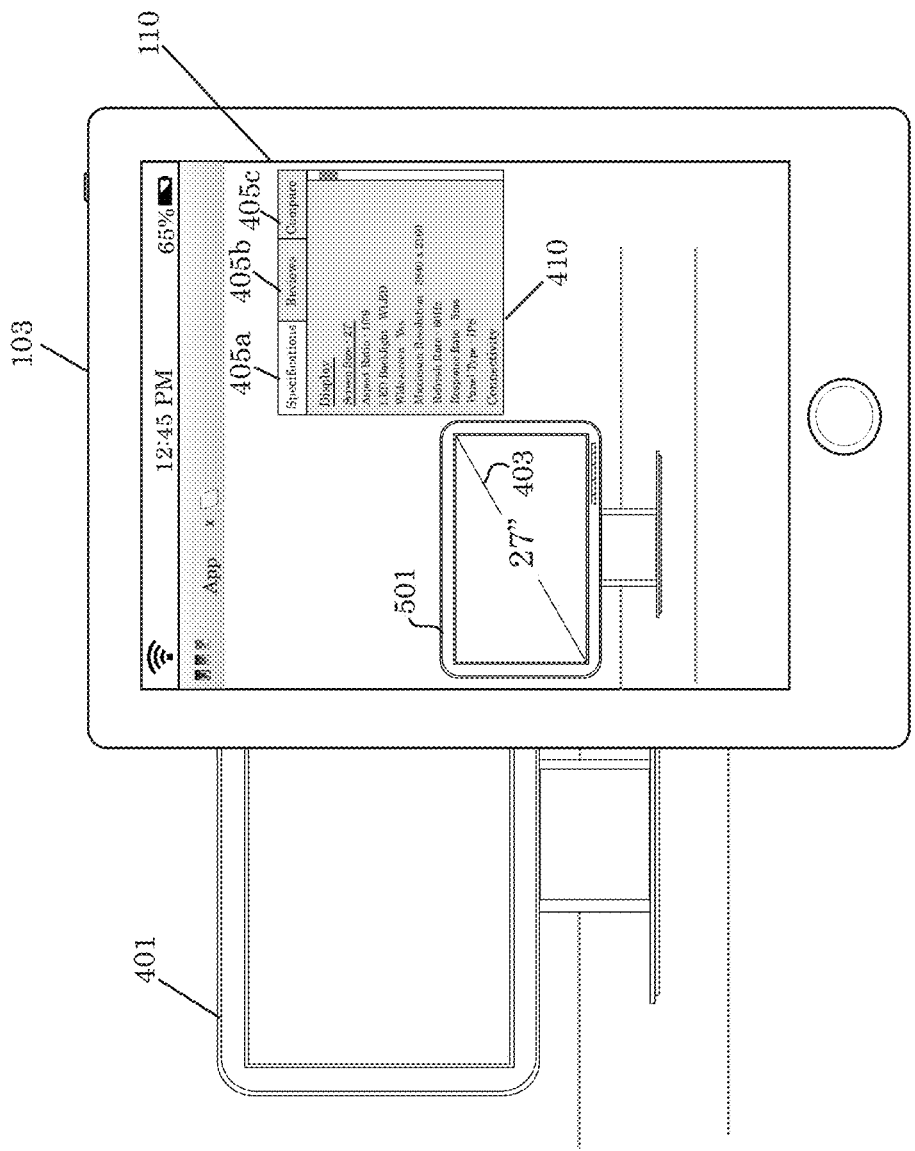
FIG. 5 depicts a first person view of a user viewing a display device of an alternative embodiment of an augmented display system viewing an object and overlaying product information about the object onto the display device viewing the object.

FIGS. 4d and 4e demonstrate additional examples of product information 405 that may be provided and displayed by the HUD module's 115 GUI 410 in accordance with the user's 301 selection of product information to view. For example, in FIG. 4d the user 301 may toggle the type of product information 405 being viewed from the specifications 405a of the object 401 to reviews 405b about the object 401 by other users or purchasers. The reviews 405b corresponding to the currently viewed object 401 may be presented right on the GUI 410 displayed by the display device 110 while simultaneously viewing the object 401 or digital representation 501 thereof in real time through the visual recognition system 124.

Additionally, in FIG. 4e, the HUD module 115 may also display a comparison 405c between product information describing the currently viewed object 401 and previously viewed objects that are similar to the presently viewed object 401. Embodiments of the HUD module 410 present a side by side list comparing each of the features, allowing for a user to make a purchasing decision based on the user's 301 own knowledge of the products. In other examples, the differences in the similar objects 410 may be analyzed by an analytics module 119, wherein the analytics module may draw conclusions based on the product information 405 and the HUD module 115 may display the analytics module's 119 purchasing recommendations to the user 301.

In the example provided in FIG. 4e, the user 301 has been viewing multiple different types of computer monitors. As the user 301 views each computer monitor, the product information has been stored by the augmented display system 103. In FIG. 4e, the augmented display system 103 is providing a side by side comparison of the corresponding product features for the presently viewed object 401 which is described by a monitor model labelled in this example as LX700, against a previously viewed monitor at some point in time previously (labelled as model DX550). While the current example is only comparing two different objects 401 that have been viewed by the user, any number of previously viewed products may be shown, based on the viewing history of the user 301 and the length of time that a user or augmented display system 103 has selected as the look-back point for comparing similar products and objects 401. For instance a user 301 may set the lookback period to 1 week, 1 month, 6 months, 1 year, etc. If the user 301 has viewed only a single similar product in the look-back period the comparison 405c may show only display the product information of the present object 410 and the only other similar product viewed. However, if the user 301 has viewed a plurality of similar products, the product information 405 for each may be listed during the comparison 405c by the HUD module 115.

Moreover, in some instances, a user 301 may not have seen any similar products to the object 401 currently being viewed by the user 301. Accordingly, in some embodiments, the augmented display system 103 (specifically the product module 113 may seek out similar products to the currently viewed object 401 that may not have been viewed by the user 301 in person. The HUD module 115 may add the product information for the unviewed but similar products to the comparison 405c and/or create a recommendation via the analytics module 119 and display said comparison 405c and/or recommendation on the GUI 410 of the HUD.

In some embodiments of the augmented display system 103, the AR comparison module 105 may comprise a speech recognition module 117. Embodiments of the speech recognition module 117 may access, control, receive and process voice commands in the form of audio data recorded by the audio recording system 126. Embodiments of the audio recording system 126 may comprise one or more microphones receiving audio data from a user 301. The user 301 may speak to the augmented display system 103 by speaking into one or more of the microphones. In some embodiments, the recorded audio input data may be transcribed by the speech recognition system 117 into text and scanned by the speech recognition for keywords and/or commands. Upon identifying one or more commands, the speech recognition system 117 may transmit the commands or audio inputs to one or more respective modules or the processor 116 for execution of said commands or inputs by the user 301. For example, the user 301 may implement voice commands via the audio recording system 126 to toggle the product information displayed by the HUD and GUI. As the user 301 inputs voice commands, the voice commands are recognized by the speech recognition module 126 as a command to toggle the product information displayed by the HUD module 115. The speech recognition module 117 may send a system call to the HUD module directing the HUD module 115 to toggle the product information accordingly.

Referring to the drawings, FIG. 2a to FIG. 2d depict an embodiment of an augmented display system 103 which may be worn the user 301. As shown in the figures, the exemplary embodiment of the augmented display system 103 may be a pair of glasses comprising a frame 203, a pair of arms 205 each comprising a hinge and a pair of lenses 207. The frame 203, arms 205 and lenses may be constructed out of any material known by a person skilled in the art of glasses construction. For example, the underlying components of the glasses of the augmented display system 103 may be constructed out of various plastics, resins, rubbers, metals or metal alloys, etc. While the exemplary embodiment of the augmented display system 103 may be depicted as glasses, this should in no way be limiting to the appearance that the augmented display system 103 may take. Glasses are merely one example and the augmented display system 103 may take other forms that comprise computer system capable of overlaying images or video data projected by the computer system onto a display device 110 having a HUD and GUI overlaid onto the object 401 or digital representation 501, as an object is being viewed in real time by a visual recognition system 124. For example, a mobile device or tablet computer shown in FIG. 3*a*-3*b* acting as an augmented display system 103 having a display device 110, visual recognition system 125 and audio recording system 126 as shown.

The embodiment of the glasses used as an augmented display system 103 may include electrical and computing components integrated into the glasses themselves. For example, a projection device may be installed within the housing 201 attached to the frame 203 or arms 205 of the augmented display system 103 as shown in FIG. 2*a*-2*d*. Within the interior of the housing 201, the computer system components integrated therein may include any of the components described above for the augmented display system 103 and may integrate components of the generic computer system 900 of FIG. 9 discussed in detail below, including a processor 991, memory devices 994, 995 an input device 992 and an output device 993. Additional specialized hardware and software components that may be integrated into glasses embodiment may include the profile module 107, visual recognition module 108, display controller 109, product module 113, HUD module 115, speech recognition module 117, analytics module 117, display device 110, visual recognition system 124 and audio recording system 126.

Method for Comparing Products with Augmented Reality

Figure 8:
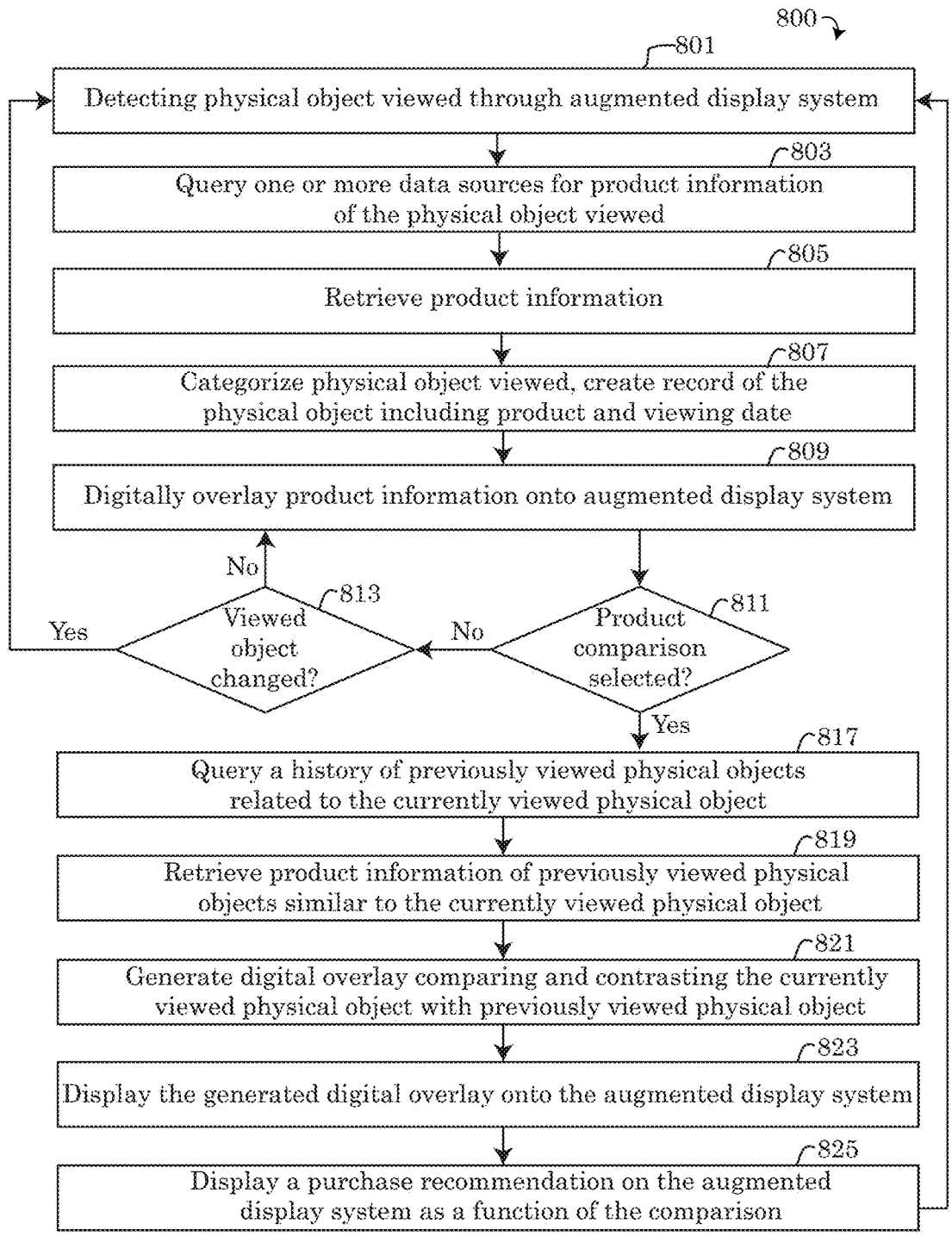
FIG. 8 depicts an embodiment of an algorithm for comparing products using augmented reality with the systems, devices, methods and tools described throughout the present disclosure.

The drawing of FIG. 8 represents an embodiment 800 of an algorithm that may be implemented for comparing products using augmented reality, in accordance with the systems described in FIGS. 1-7 using one or more computer systems defined generically in FIG. 9 below, and more specifically by the specific embodiments depicted in FIGS. 1-7. A person skilled in the art should recognize that the steps of the method described in FIG. 8 may not require all of the steps disclosed herein to be performed, nor does the algorithm of FIG. 8 necessarily require that all the steps be performed in the particular order presented. Variations of the method steps presented in FIG. 8 may be performed in a different order than presented by FIG. 8.

The algorithm 800 described in FIG. 8 may describe an embodiment of an algorithm for comparing products using an augmented reality system 103. The algorithm 800 may initiate in step 801 by detecting the presence of an object 401 being viewed through visual recognition system 124 of the augmented display system 103. Detection of the object 401 may be performed using one or more object recognition techniques described above, by tracking the eye gaze of the user 301 or by allowing the user to manually identify when viewing an object of interest to said user. A visual recognition module 108 may identify the type of object 401, and assign a category, keywords or corresponding meta tags to the type of object. In step 803, the visual recognition module 108 may call the product module 113 to query one or more product data sources 131 for product information 405 associated with the object 401 detected in step 801.

In step 805, the product module 113 may retrieve the product information 405 associated with identified object 401 from one or more product data sources 131. Step 805 may include a step of downloading the product information 405 from each product data source 405 and storing said product information 405 in a computer readable format in a data storage device, such as the local data storage device 118 or a network accessible storage device (i.e. the network repository 133). Subsequently, in step 807, records of the object currently being viewed by the visual recognition system 124 may be created. The product module 113 may receive a categorization of the object 401 from the visual recognition module 108, including a category of the object 401, along with any associated keywords, meta tags, identifiers, etc. The profile module 113 may create and store a record of the viewership of the physical 401 including identified products, product information 401, viewing date and categorizing information.

In step 809 of the algorithm 800, the HUD module 113 may access the product information obtained by the products module 113 and digitally overlay the obtained product information 405 onto a GUI of the augmented display system 103, which may include one or more virtual indicators 403 as a function of the selected product features 407 currently being viewed by the user 301. The GUI may dynamically change and alter the types of product information 405 displayed during the digital overlaying step depending upon the user's selection of product information to be displayed by the augmented display system 103. As the user 301 modifies the selected product features 407 to be displayed, the HUD module 115 may amend the product information 405 being displayed by the display device 110 accordingly.

Embodiments of the algorithm 800 may perform a determination in step 811 to determine whether or not the user 301 has selected to display a product comparison 405*c* between products of the currently viewed object 401 and products of the previously viewed objects. If, the user has not selected to view a comparison 405*c*, the algorithm may move to step 813 and determine if the object being viewed 401 has changed. If the object being viewed has changed, the algorithm 800 may return back to step 801 whereas if the same object 401 is being viewed by the user 301 through the visual recognition system 124, the algorithm 800 may return to step 809.

Conversely, if a product comparison 405*c* has been selected by the user 301 in step 811, the algorithm 800 may move onto step 817, wherein the product module 113 may query a history of previously viewed objects 401 that may be related or similar to the currently viewed object that was detected in step 801 of the algorithm 800. Similar or related objects 401 may include objects that may have been viewed having similar categorizations, keywords, meta tags or identifiers associated therewith. In some embodiments, the product module 113 may also query one or more product data sources 131 for similar or related products to the object 401 currently being viewed and retrieve the product information 405 for comparison despite the user 301 not having viewed the products or objects associated with the products in through the visual recognition system 124.

Upon the completion of the query in step 817, the product module 113 may, in step 819, retrieve and load into the memory device 114 of the augmented display system 103 the product information 405 of the previously viewed objects similar to the currently viewed object 401. In step 821, the HUD module 115 may generate a digital overlay comparing and contrasting the features of the currently viewed object with the previously viewed (or other existing products) objects that are similar, as described in step 817 above. The HUD module 115 in step 823 may display the generated digital overlay of the product information 405 in the comparison 405*c* as part of the GUI of the HUD, allowing for the user 301 to simultaneously view the current object 401, product features of the object 401 and product features of previously viewed objects in a side by side comparison 405*c*. In some embodiments, the algorithm 800 may further include a step 825 wherein the HUD module 115 displays a purchasing recommendation on the GUI of the display device 110 as a function of the comparison 405*c* generated and displayed in steps 821 and 823. Said purchasing recommendation displayed in step 825 may be a conclusion drawn by an analytics module 119 of the augmented display system 103 as a function of the analytics module comparison of the product information 405 of each object 401 as well as the associated product features for each.

Computer System

Figure 9:
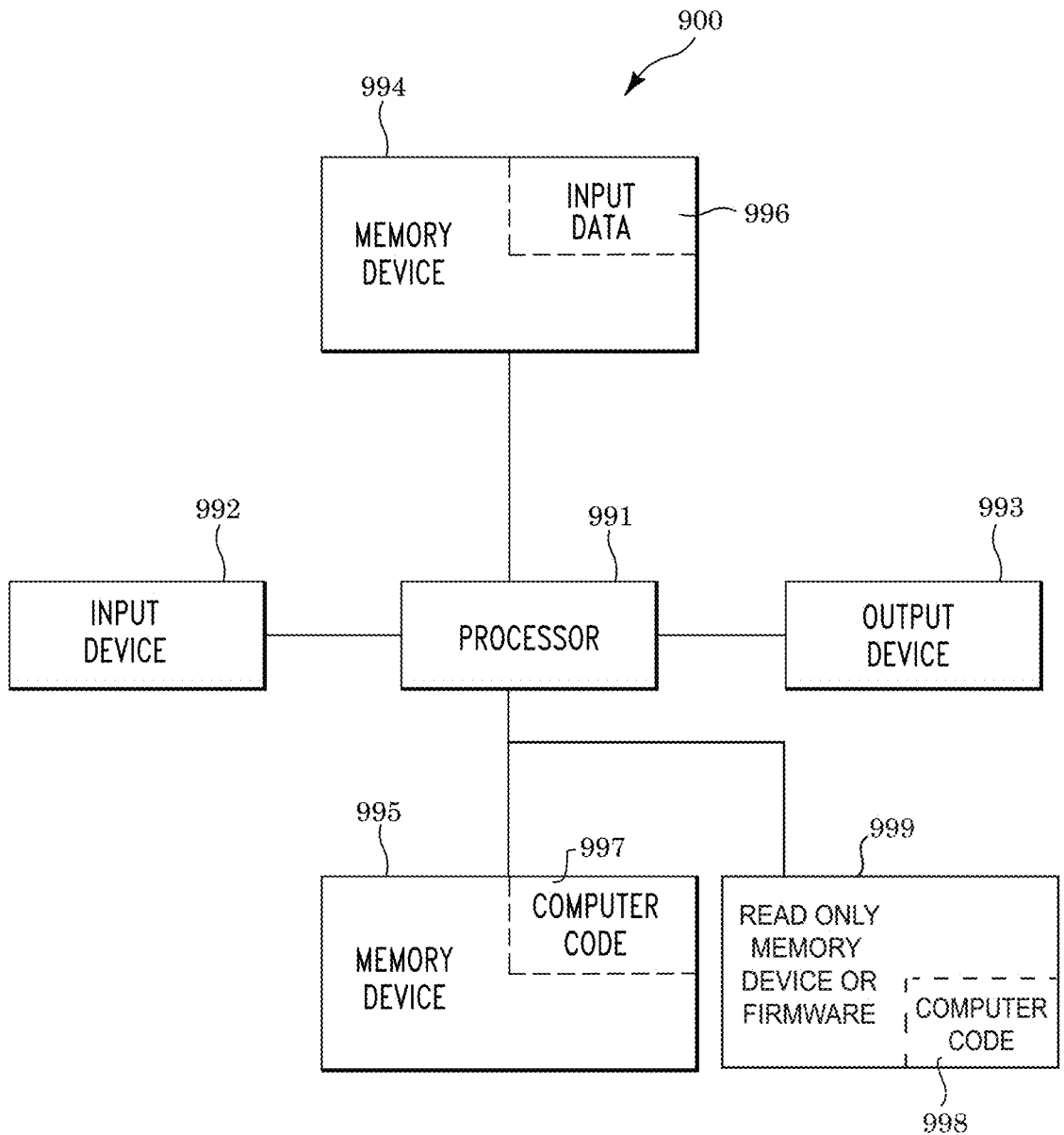
FIG. 9 depicts a block diagram of a computer system able to implement the methods for comparing products using augmented reality, consistent with the disclosure of the present application.

Referring to the drawings, FIG. 9 illustrates a block diagram of a computer system 900 that may be included in the systems of FIGS. 1-7 and for implementing methods for comparing products using augmented reality as described in FIG. 9 and in accordance with the embodiments described in the present disclosure. The computer system 900 may generally comprise a processor 991, otherwise referred to as a central processing unit (CPU), an input device 992 coupled to the processor 991, an output device 993 coupled to the processor 991, and memory devices 994 and 995 each coupled to the processor 991. The input device 992, output device 993 and memory devices 994, 995 may each be coupled to the processor 991 via a bus. Processor 991 may perform computations and control the functions of computer 900, including executing instructions included in the computer code 997 for tools and programs for comparing products using augmented reality, in the manner prescribed by the embodiments of the disclosure using the systems of FIGS. 1-7, wherein the instructions of the computer code 997 may be executed by processor 991 via memory device 995. The computer code 997 may include software or program instructions that may implement one or more algorithms for implementing the methods for comparing products using augmented reality, as described in detail above. The processor 991 executes the computer code 997. Processor 991 may include a single processing unit, or may be distributed across one or more processing units in one or more locations (e.g., on a client and server).

The memory device 994 may include input data 996. The input data 996 includes any inputs required by the computer code 997, 998. The output device 993 displays output from the computer code 997, 998. Either or both memory devices 994 and 995 may be used as a computer usable storage medium (or program storage device) having a computer readable program embodied therein and/or having other data stored therein, wherein the computer readable program comprises the computer code 997, 998. Generally, a computer program product (or, alternatively, an article of manufacture) of the computer system 900 may comprise said computer usable storage medium (or said program storage device).

Memory devices 994, 995 include any known computer readable storage medium, including those described in detail below. In one embodiment, cache memory elements of memory devices 994, 995 may provide temporary storage of at least some program code (e.g., computer code 997, 998) in order to reduce the number of times code must be retrieved from bulk storage while instructions of the computer code 997, 998 are executed. Moreover, similar to processor 991, memory devices 994, 995 may reside at a single physical location, including one or more types of data storage, or be distributed across a plurality of physical systems in various forms. Memory devices 994, 995 can include data distributed across, for example, a local area network (LAN) or a wide area network (WAN). Further, memory devices 994, 995 may include an operating system (not shown) and may include other systems not shown in the figures.

In some embodiments, rather than being stored and accessed from a hard drive, optical disc or other writeable, rewriteable, or removable hardware memory device 994, 995, stored computer program code 998 (e.g., including algorithms) may be stored on a static, non-removable, read-only storage medium such as a Read-Only Memory (ROM) device 999, or may be accessed by processor 991 directly from such a static, non-removable, read-only medium 999. Similarly, in some embodiments, stored computer program code 997 may be stored as computer-readable firmware 999, or may be accessed by processor 991 directly from such firmware 999, rather than from a more dynamic or removable hardware data-storage device 995, such as a hard drive or optical disc.

In some embodiments, the computer system 900 may further be coupled to an Input/output (I/O) interface 112 and a computer data storage unit (for example a data store, data mart or repository). An I/O interface 112 may include any system for exchanging information to or from an input device 992 or output device 993. The input device 992 may be, inter alia, a keyboard, joystick, trackball, touchpad, mouse, sensors, beacons, RFID tags, audio recording system 126 including one or more microphones, biometric input device, visual recognition system 124 comprising a camera system, a timer, etc. The output device 993 may be, inter alia, a printer, a plotter, a display device (such as a computer screen, monitor or device capable of projecting an image thereon), a magnetic tape, a removable hard disk, a floppy disk, etc. The memory devices 994 and 995 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 900, and may include any type of transmission link, including electrical, optical, wireless, etc.

The I/O interface 112 may allow the computer system 900 to store information (e.g., data or program instructions such as program code 997, 998) on and retrieve the information from a computer data storage unit (not shown in FIG. 9). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to comparing products using augmented reality. Thus, an embodiment of the present invention discloses a process for supporting computer infrastructure, where the process includes providing at least one support service for at least one of integrating, hosting, maintaining and deploying computer-readable code (e.g., program code 997, 998) in a computer system (e.g., computer 800) including one or more processor(s) 991, wherein the processor(s) carry out instructions contained in the computer code 997 causing the computer system to compare products using augmented reality. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for comparing products using augmented reality in this application. Thus the present invention discloses a process for supporting, deploying and/or integrating computer infrastructure, integrating, hosting, maintaining, and deploying computer-readable code into the computer system 900, wherein the code in combination with the computer system 900 is capable of performing a method of comparing products using augmented reality.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user 301's computer, partly on the user 301's computer, as a stand-alone software package, partly on the user 301's computer and partly on a remote computer or entirely on the remote computer or server. In the latter scenario, the remote computer may be connected to the user 301's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for comparing products using augmented reality comprising the steps of:
    detecting, by a processor of an augmented display system, a presence of an object being viewed, by a user, through a visual recognition system and an associated lens of said augmented display system;
    determining, by the processor, the object being viewed by the visual recognition system;
    determining, by the processor, a first specified portion of the object being viewed by the visual recognition system;
    initially detecting, by the processor, that the user has manipulated a position of the visual recognition system and the associated lens;
    determining, by the processor in response to said initially detecting, a second specified portion of the object being viewed by the visual recognition system, wherein the first specified portion differs from the second specified portion;
    querying, by the processor, a data source for product information describing one or more features of the first specified portion of the object and the second specified portion of the object being viewed;
    tagging, by the processor, the product information with keywords, meta tags, identifiers, and a retrieval date configured to search and retrieve the product information;
    cataloging and registering within a specified database, by the processor, the product information with the keywords, the meta tags, the identifiers, and the retrieval date;
    overlaying, by the processor, the product information onto a heads-up display (HUD) generated by a display device, of said augmented display system, in a vicinity of the first specified portion of the object and the second specified portion of the object or a digital representation of the first specified portion of the object and the second specified portion of the object recorded by the visual recognition system in real-time corresponding to the product information, wherein the display device is placed at a specified position overlaying a portion of said associated lens;
    virtually identifying, by the processor, features of the first specified portion of the object and the second specified portion of the object;
    generating, by the processor in response to said virtually identifying, a digital overlay comparing and contrasting said features of the first specified portion of the object and the second specified portion of the object currently recorded through the visual recognition system and previously viewed objects;
    generating, by the processor, an additional digital overlay comprising product reviews, social media discussions, comparative products, and associated recommendations associated with said features of the first specified portion of the object and the second specified portion of the object;
    receiving, by the processor via an audio recording apparatus of the augmented display system, an audio command for toggling the digital overlay for the comparing and contrasting of said features of the first specified portion of the object and the second specified portion of the object and the previously viewed objects;
    receiving, by the processor, hand gesture command for additionally toggling the digital overlay for the comparing and contrasting of said features of the first specified portion of the object and the second specified portion of the object and the previously viewed objects;
    processing, by the processor, the audio command and the hand gesture command;
    modifying, by the processor in response to a user command, specific user selected features of the first specified portion of the object and the second specified portion of the object from a screen size of a monitor to aspect ratio information of the monitor;
    modifying, by the processor, a virtual indicator of the HUD from presenting diameter measurements of the monitor to presenting a height and width of the monitor;
    generating, by the processor based on a visibility of the specific user selected features in three-dimensional space, descriptions associated with the specific user selected features within the HUD, wherein a feature of the specific user selected features comprises a description of an input port on the monitor positioned on backside of the monitor relative to a position of a screen of the monitor, and wherein the virtual indicator is configured to create a guide line indicating to the user, a position of the feature; and displaying with respect to the height and width of the monitor, by the processor via a projection device installed within a housing attached to the augmented display system in response to said receiving the audio command, said receiving the hand gesture command, and said processing the audio command and the hand gesture command, the digital overlay comparing and contrasting the specific user selected features of the first specified portion of the object and the second specified portion of the object currently recorded by the visual recognition system, the additional digital overlay, and the previously viewed objects onto the HUD of the display device.

2. The method of claim 1, wherein the step of detecting the presence of the object is performed using a method selected from a group consisting of tracking eye gaze, object recognition and manually identifying interest in the object.

3. The method of claim 1, wherein the visual recognition system comprises a camera streaming video of the object viewed to the HUD.

4. The method of claim 1, wherein the previously viewed objects similar to the object recorded through the visual recognition system are identified as a function of type, brand name, keyword tag or product category.

5. The method of claim 1, wherein overlaying the product information onto the HUD toggles the product information overlaid onto a the real-time digital representation of the first specified portion of the object and the second specified portion of the object as a function of the one or more of the features selected by a user for viewing.

6. The method of claim 1, wherein the HUD automatically changes the product information as a function of one or more features of the object becoming instantly within view of the visual recognition system.

7. The method of claim 1, further comprising the steps of: further querying, by the processor, a history of previously viewed objects similar to the object recorded through the visual recognition system, wherein the HUD displays a recommendation to purchase a product from the object currently being viewed or the history of previously viewed objects similar to the object recorded through the visual recognition system, as a function of comparing the product information.

8. A computer system, comprising:
a processor;
a memory device coupled to the processor;
an augmented display system comprising a visual recognition system, a camera, an audio recording apparatus, a projection device, an associated lens, and a display device; and
a computer readable storage device coupled to the processor, wherein the storage device contains program code executable by the processor via the memory device to implement a method for comparing products using augmented reality comprising the steps of:
detecting, by the processor, a presence of an object being viewed, by a user, through a visual recognition system and an associated lens of said augmented display system;
determining, by the processor, the object being viewed by the visual recognition system;
determining, by the processor, a first specified portion of the object being viewed by the visual recognition system;
initially detecting, by the processor, that the user has manipulated a position of the visual recognition system and the associated lens;
determining, by the processor in response to said initially detecting, a second specified portion of the object being viewed by the visual recognition system, wherein the first specified portion differs from the second specified portion;
querying, by the processor, a data source for product information describing one or more features of the first specified portion of the object and the second specified portion of the object being viewed;
tagging, by the processor, the product information with keywords, meta tags, identifiers, and a retrieval date configured to search and retrieve the product information;
cataloging and registering within a specified database, by the processor, the product information with the keywords, the meta tags, the identifiers, and the retrieval date;
overlaying, by the processor, the product information onto a heads-up display (HUD) generated by a display device, of said augmented display system, in a vicinity of the first specified portion of the object and the second specified portion of the object or a digital representation of the first specified portion of the object and the second specified portion of the object recorded by the visual recognition system in real-time corresponding to the product information, wherein the display device is placed at a specified position overlaying a portion of said associated lens;
virtually identifying, by the processor, features of the first specified portion of the object and the second specified portion of the object;
generating, by the processor in response to said virtually identifying, a digital overlay comparing and contrasting said features of the first specified portion of the object and the second specified portion of the object currently recorded through the visual recognition system and previously viewed objects;
generating, by the processor, an additional digital overlay comprising product reviews, social media discussions, comparative products, and associated recommendations associated with said features of the first specified portion of the object and the second specified portion of the object;
receiving, by the processor via an audio recording apparatus of the augmented display system, an audio command for toggling the digital overlay for the comparing and contrasting of said features of the first specified portion of the object and the second specified portion of the object and the previously viewed objects;
receiving, by the processor, hand gesture command for additionally toggling the digital overlay for the comparing and contrasting of said features of the first specified portion of the object and the second specified portion of the object and the previously viewed objects;
processing, by the processor, the audio command and the hand gesture command;
modifying, by the processor in response to a user command, specific user selected features of the first specified portion of the object and the second specified portion of the object from a screen size of a monitor to aspect ratio information of the monitor;
modifying, by the processor, a virtual indicator of the HUD from presenting diameter measurements of the monitor to presenting a height and width of the monitor;
generating, by the processor based on a visibility of the specific user selected features in three-dimensional space, descriptions associated with the specific user selected features within the HUD, wherein a feature of the specific user selected features comprises a description of an input port on the monitor positioned on backside of the monitor relative to a position of a screen of the monitor, and wherein the virtual indicator is configured to create a guide line indicating to the user, a position of the feature; and displaying with respect to the height and width of the monitor, by the processor via a projection device installed within a housing attached to the augmented display system in response to said receiving the audio command, said receiving the hand gesture command, and said processing the audio command and the hand gesture command, the digital overlay comparing and contrasting the specific user selected features of the first specified portion of the object and the second specified portion of the object currently recorded by the visual recognition system, the additional digital overlay, and the previously viewed objects onto the HUD of the display device.

9. The computer system of claim 8, wherein detecting the presence of the object is performed using a method selected from a group consisting of tracking eye gaze, object recognition and manually identifying interest in the object.

10. The computer system of claim 8, wherein the previously viewed objects similar to the object recorded through the visual recognition system are identified as a function of type, brand name, keyword tag or product category.

11. The computer system of claim 8, wherein overlaying the product information onto the HUD toggles the product information overlaid onto a real-time digital representation of the object as a function of the one or more of the features selected by a user for viewing.

12. The computer system of claim 8, wherein the HUD automatically changes the product as a function of one or more features of the object becoming instantly within view of the visual recognition system.

13. The computer system of claim 8, further comprising the steps of: further querying, by the processor, a history of previously viewed objects similar to the object recorded through the visual recognition system, wherein the HUD displays a recommendation to purchase a product selected from either the object currently being viewed or an object within the history of previously viewed objects similar to the object recorded through the visual recognition system, as a function of comparing the product information.

14. A computer program product comprising:
one or more computer readable hardware storage devices having computer readable program code stored therein, said program code containing instructions executable by a central processing unit (CPU) of a computer system comprising an augmented display system implementing a method for comparing products using augmented reality comprising the steps of:
detecting, by the CPU, a presence of an object being viewed, by a user, through a visual recognition system and an associated lens of said augmented display system;
determining, by the CPU, the object being viewed by the visual recognition system;
determining, by the CPU, a first specified portion of the object being viewed by the visual recognition system;
initially detecting, by the CPU, that the user has manipulated a position of the visual recognition system and the associated lens;
determining, by the CPU in response to said initially detecting, a second specified portion of the object being viewed by the visual recognition system, wherein the first specified portion differs from the second specified portion;
querying, by the CPU, a data source for product information describing one or more features of the first specified portion of the object and the second specified portion of the object being viewed;
tagging, by the CPU, the product information with keywords, meta tags, identifiers, and a retrieval date configured to search and retrieve the product information;
cataloging and registering within a specified database, by the CPU, the product information with the keywords, the meta tags, the identifiers, and the retrieval date;
overlaying, by the CPU, the product information onto a heads-up display (HUD) generated by a display device, of said augmented display system, in a vicinity of the first specified portion of the object and the second specified portion of the object or a digital representation of the first specified portion of the object and the second specified portion of the object recorded by the visual recognition system in real-time corresponding to the product information, wherein the display device is placed at a specified position overlaying a portion of said associated lens;
virtually identifying, by the CPU, features of the first specified portion of the object and the second specified portion of the object;
generating, by the CPU, in response to said virtually identifying, a digital overlay comparing and contrasting said features of the first specified portion of the object and the second specified portion of the object currently recorded through the visual recognition system and previously viewed objects;
generating, by the CPU, an additional digital overlay comprising product reviews, social media discussions, comparative products, and associated recommendations associated with said features of the first specified portion of the object and the second specified portion of the object;
receiving, by the CPU via an audio recording apparatus of the augmented display system, an audio command for toggling the digital overlay for the comparing and contrasting of said features of the first specified portion of the object and the second specified portion of the object;
receiving, by the CPU, hand gesture command for additionally toggling the digital overlay for the comparing and contrasting of said features of the first specified portion of the object and the second specified portion of the object and the previously viewed objects;
processing, by the CPU, the audio command and the hand gesture command;
modifying, by the CPU in response to a user command, specific user selected features of the first specified portion of the object and the second specified portion of the object from a screen size of a monitor to aspect ratio information of the monitor;
modifying, by the CPU, a virtual indicator of the HUD from presenting diameter measurements of the monitor to presenting a height and width of the monitor;
generating, by the CPU based on a visibility of the specific user selected features in three-dimensional space, descriptions associated with the specific user selected features within the HUD, wherein a feature of the specific user selected features comprises a description for an input port on the monitor positioned on backside of the monitor relative to a position of a screen of the monitor, and wherein the virtual indicator is configured to create a guide line indicating to the user, a position of the feature; and displaying with respect to the height and width of the monitor, by the CPU via a projection device installed within a housing attached to the augmented display system in response to said receiving the audio command, said receiving the hand gesture command, and said processing the audio command and the hand gesture command, the digital overlay comparing and contrasting the specific user selected features of the first specified portion of the object and the second specified portion of the object currently recorded by the visual recognition system, the additional digital overlay, and the previously viewed objects onto the HUD of the display device.

15. The computer program product of claim 14, wherein detecting the presence of the object is performed using a method selected from a group consisting of tracking eye gaze, object recognition and manually identifying interest in the object.

16. The computer program product of claim 14, wherein the previously viewed objects similar to the object recorded through the visual recognition system are identified as a function of type, brand name, keyword tag or product category.

17. The computer program product of claim 14, wherein overlaying the product information onto the HUD toggles the product information overlaid onto a real-time digital representation of the object as a function of the one or more of the features selected by a user for viewing.

18. The computer program product of claim 14, wherein the HUD automatically changes the product information as a function of one or more features of the object becoming instantly within view of the visual recognition system.

19. The computer program product of claim 14, further comprising the steps of:

further querying, by the processor, a history of previously viewed objects similar to the object recorded through the visual recognition system, wherein the HUD displays a recommendation to purchase a product from the object currently being viewed or the history of previously viewed objects similar to the object recorded through the visual recognition system, as a function of comparing the product information.

* * * * *